United States Patent
Miyawaki

(10) Patent No.: US 10,615,394 B2
(45) Date of Patent: Apr. 7, 2020

(54) ENERGY STORAGE APPARATUS

(71) Applicant: GS Yuasa International Ltd., Kyoto-shi (JP)

(72) Inventor: Yasutaka Miyawaki, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 53 days.

(21) Appl. No.: 15/191,338

(22) Filed: Jun. 23, 2016

(65) Prior Publication Data

US 2017/0005314 A1 Jan. 5, 2017

(30) Foreign Application Priority Data

Jun. 30, 2015 (JP) .................. 2015-132240
Sep. 15, 2015 (JP) .................. 2015-182300

(51) Int. Cl.
*H01M 2/20* (2006.01)
*H01M 2/10* (2006.01)
(Continued)

(52) U.S. Cl.
CPC ......... *H01M 2/202* (2013.01); *H01M 2/0285* (2013.01); *H01M 2/06* (2013.01);
(Continued)

(58) Field of Classification Search
CPC ...... H01M 2/202; H01M 2/0285; H01M 2/06; H01M 2/1077; H01M 2/1016;
(Continued)

(56) References Cited

U.S. PATENT DOCUMENTS

2010/0039953 A1  2/2010 Zhang
2011/0020686 A1  1/2011 Yamamoto et al.
(Continued)

FOREIGN PATENT DOCUMENTS

EP     3 032 608 A1    6/2016
JP     H 07-183015 A   7/1995
(Continued)

OTHER PUBLICATIONS

Extended European Search Report dated Nov. 10, 2016.
European Office Action, dated Nov. 23, 2018, in European Patent Application No. 16 175 367.8.

*Primary Examiner* — Helen Oi K Conley
(74) *Attorney, Agent, or Firm* — McGinn I.P. Law Group, PLLC.

(57) ABSTRACT

Provided is an energy storage apparatus which includes a first energy storage device having a first terminal which is either a positive electrode terminal or a negative electrode terminal, wherein the energy storage apparatus further includes a terminal neighboring member which is disposed adjacently to the first terminal of the first energy storage device, and the terminal neighboring member includes: a first housing portion capable of housing a first conductive member which connects the first terminal and a second terminal which a second energy storage device different from the first energy storage device has to each other; and a first lead-out portion capable of leading out a second conductive member which connects the first terminal and a third terminal which a third energy storage device different from the first energy storage device and the second energy storage device has to each other from the first housing portion.

15 Claims, 15 Drawing Sheets

(51) Int. Cl.
*H01M 2/30* (2006.01)
*H01M 2/02* (2006.01)
*H01M 2/06* (2006.01)
*H01M 10/0525* (2010.01)

(52) U.S. Cl.
CPC ....... *H01M 2/1016* (2013.01); *H01M 2/1077* (2013.01); *H01M 2/206* (2013.01); *H01M 2/30* (2013.01); *H01M 2/305* (2013.01); *H01M 10/0525* (2013.01); *H01M 2220/20* (2013.01)

(58) Field of Classification Search
CPC ........ H01M 2/206; H01M 2/30; H01M 2/305; H01M 10/0525
See application file for complete search history.

(56) References Cited

U.S. PATENT DOCUMENTS

| | | |
|---|---|---|
| 2011/0076521 A1 | 3/2011 | Shimizu et al. |
| 2012/0114991 A1 | 5/2012 | Park et al. |
| 2012/0251855 A1 | 10/2012 | Miyawaki et al. |
| 2013/0273398 A1 | 10/2013 | Hoshi et al. |
| 2013/0309553 A1 | 11/2013 | Kinoshita et al. |
| 2014/0220396 A1* | 8/2014 | Lee .................... H01M 2/1077 429/61 |
| 2014/0329136 A1 | 11/2014 | Kinoshita et al. |
| 2014/0370341 A1 | 12/2014 | Oshiba et al. |
| 2016/0164054 A1 | 6/2016 | Yamamoto et al. |

FOREIGN PATENT DOCUMENTS

| | | |
|---|---|---|
| JP | H 09-199097 A | 7/1997 |
| JP | H 10-012204 A | 1/1998 |
| JP | 2003-051297 A | 2/2003 |
| JP | 2004-031049 A | 1/2004 |
| JP | 2005-174673 A | 6/2005 |
| JP | 2008-124250 A | 5/2008 |
| JP | 2010-225583 A | 10/2010 |
| JP | 2012-204296 A | 10/2012 |
| JP | 2012-204298 A | 10/2012 |
| JP | 2013-020841 A | 1/2013 |
| JP | 2013-105572 A | 5/2013 |
| JP | 2014-090496 A | 5/2014 |
| JP | 2014-093163 A | 5/2014 |
| JP | 2014-112546 A | 6/2014 |
| JP | 2015-002078 A | 1/2015 |
| JP | 2015-041586 A | 3/2015 |
| WO | WO 2013/008588 A1 | 1/2013 |
| WO | WO 2014/192943 A1 | 12/2014 |

* cited by examiner

ENERGY STORAGE APPARATUS

CROSS-REFERENCE TO RELATED APPLICATIONS

This application claims the benefit of Japanese patent applications No. 2015-132240 filed on Jun. 30, 2015, and No. 2015-182300 filed on Sep. 15, 2015, which are incorporated by reference.

FIELD

The present invention relates to an energy storage apparatus provided with energy storage devices.

BACKGROUND

As an energy storage apparatus provided with energy storage devices, conventionally, there has been known an energy storage apparatus having the configuration where electrode terminals of energy storage devices disposed adjacently to each other are connected by a bus bar (see JP-A-2010-225583, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the conventional energy storage apparatus, the number of energy storage devices to be disposed is set in advance, and the energy storage apparatus is designed in conformity with the number of energy storage devices. Accordingly, it is difficult to change the number of energy storage devices. That is, in the conventional energy storage apparatus, the arrangement of the bus bars and resin members for holding the bus bars are designed in conformity with the number of energy storage devices. Thus, to change the number of energy storage devices, it is necessary to perform changing of a shape of the resin member or the like.

An object of the present invention to provide an energy storage apparatus which can easily change the number of energy storage devices.

According to an aspect of the present invention, there is provided an energy storage apparatus which includes: a first energy storage device including a first terminal that is either a positive electrode terminal or a negative electrode terminal; and a terminal neighboring member that is disposed adjacently to the first terminal of the first energy storage device, wherein the terminal neighboring member includes: a first housing portion capable of housing a first conductive member that connects the first terminal and a second terminal, which a second energy storage device has, to each other; and a first lead-out portion capable of leading out, from the first housing portion, a second conductive member that connects the first terminal and a third terminal, which a third energy storage device has, to each other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
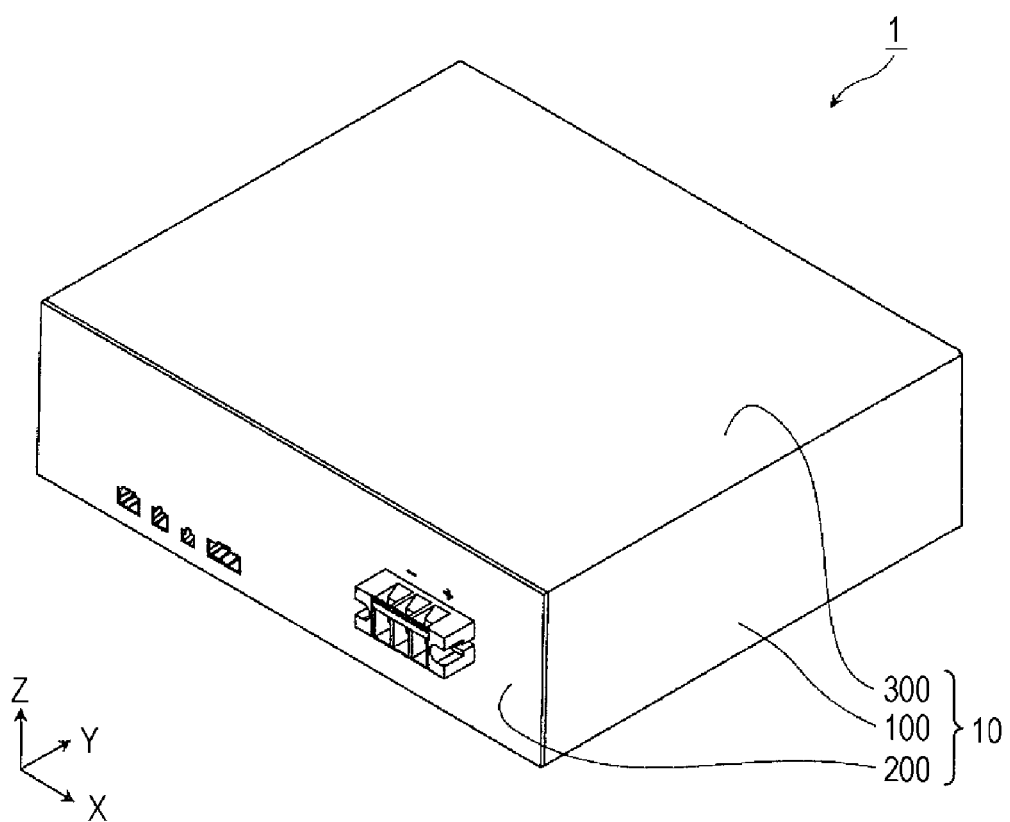
FIG. 1 is a perspective view showing the external appearance of an energy storage apparatus according to a first embodiment of the present invention.

According to an aspect of the present invention, there is provided an energy storage apparatus which includes: a first energy storage device including a first terminal that is either a positive electrode terminal or a negative electrode terminal; and a terminal neighboring member that is disposed adjacently to the first terminal of the first energy storage device, wherein the terminal neighboring member includes: a first housing portion capable of housing a first conductive member that connects the first terminal and a second terminal, which a second energy storage device has, to each other; and a first lead-out portion capable of leading out, from the first housing portion, a second conductive member that connects the first terminal and a third terminal, which a third energy storage device has, to each other.

With such a configuration, the terminal neighboring member of the energy storage apparatus includes: the first housing portion capable of housing the first conductive member which connects the first terminal of the first energy storage device and the second terminal of the second energy storage device to each other; and the first lead-out portion capable of leading out the second conductive member which connects the first terminal and the third terminal of the third energy storage device to each other from the first housing portion. That is, the second energy storage device can be connected to the first energy storage device by arranging the first conductive member in the first housing portion, and the third energy storage device can be connected to the first energy storage device by arranging the second conductive member in the first lead-out portion. With such a configuration, for example, by removing the second energy storage device from a state where the second energy storage device is connected to the first energy storage device and the third energy storage device is connected to the second energy storage device and by connecting the third energy storage device to the first energy storage device, the number of energy storage devices can be reduced. According to the energy storage apparatus, the energy storage device can be easily mounted and easily removed and hence, the number of energy storage devices can be easily changed.

The first housing portion and the first lead-out portion may be opening portions that penetrate different portions of the terminal neighboring member in different directions.

With such a configuration, the first housing portion and the first lead-out portion formed in the terminal neighboring member are formed of the opening portions which penetrate the different portions of the terminal neighboring member in the different directions. That is, by opening the first housing portion and the first lead-out portion such that the first housing portion and the first lead-out portion are directed in the direction toward the second energy storage device and in the direction toward the third energy storage device, the first energy storage device and the second energy storage device can be easily connected to each other through the first housing portion, and the first energy storage device and the third energy storage device can be easily connected to each other through the first lead-out portion.

The terminal neighboring member may include a wall formed on an outer periphery of the first housing portion, wherein the first lead-out portion may be formed on the wall.

With such a configuration, even when the wall is formed on the outer periphery of the first housing portion, the first lead-out portion can be formed easily.

The terminal neighboring member may further include: a second housing portion capable of housing a third conductive member that connects the third terminal and a fourth terminal, which is a terminal different from the second terminal of the second energy storage device, to each other; and a second lead-out portion being disposed closer to the second housing portion than the first lead-out portion and capable of leading out the second conductive member from the second housing portion.

With such a configuration, the terminal neighboring member includes: the second housing portion capable of housing the third conductive member which connects the third energy storage device and the second energy storage device to each other; and the second lead-out portion capable of leading out the second conductive member which connects the third energy storage device and the first energy storage device to each other from the second housing portion. With such a configuration, for example, by removing the second energy storage device from a state where the second energy storage device is connected to the third energy storage device and the first energy storage device is connected to the second energy storage device and by connecting the first energy storage device to the third energy storage device, the number of energy storage devices can be reduced. According to the energy storage apparatus of the present invention, the energy storage device can be easily mounted and easily removed and hence, the number of energy storage devices can be easily changed.

The second energy storage device may be an energy storage device disposed at a position disposed adjacently to the first energy storage device, wherein the third energy storage device may be an energy storage device disposed at a position different from the position disposed adjacently to the first energy storage device, and wherein the energy storage apparatus may include the third energy storage device without including the second energy storage device, and may include the second conductive member without including the first conductive member.

With such a configuration, the energy storage apparatus is configured such that the first energy storage device and the third energy storage device not disposed adjacently to the first energy storage device are connected to each other by the second conductive member. That is, usually, energy storage devices disposed adjacently to each other are connected to each other. However, according to the energy storage apparatus of the present invention, the energy storage devices which are not disposed adjacently to each other can be connected. According to the energy storage apparatus of the present invention, the degree of freedom in the arrangement of the energy storage devices can be enhanced.

According to another aspect of the present invention, there is provided an energy storage apparatus comprising: a first energy storage device including a first terminal that is either a positive electrode terminal or a negative electrode terminal; an outer connection terminal; and a terminal neighboring member that is disposed adjacently to a first terminal side of the first energy storage device, wherein the terminal neighboring member includes: a conductor housing portion capable of housing a first conductive member that connects the first terminal and a second terminal, which a second energy storage device has, to each other; and a first lead-out portion capable of leading out, from the conductor housing portion, a second conductive member that connects the first terminal and the outer connection terminal to each other.

With such a configuration, in the energy storage apparatus, the terminal neighboring member includes: the conductor housing portion capable of housing the first conductive member which connects the first terminal of the first energy storage device and the second terminal of the second energy storage device to each other; and the first lead-out portion capable of leading out the second conductive member which connects the first terminal and the outer connection terminal from the conductor housing portion. That is, the second energy storage device can be connected to the first energy storage device by arranging the first conductive member in the conductor housing portion, and the outer connection terminal can be connected to the first energy storage device by arranging the second conductive member in the first lead-out portion. Accordingly, by removing the second energy storage device from a state where the second energy storage device is connected to the first energy storage device and the outer connection terminal is connected to the second energy storage device and by connecting the outer connection terminal to the first energy storage device, the number of energy storage devices can be reduced. According to the energy storage apparatus of the present invention, the energy storage device can be easily mounted and easily removed and hence, the number of energy storage devices can be easily changed.

The conductor housing portion may be a bus bar arranging opening portion capable of housing a bus bar that connects the first terminal and the second terminal to each other as the first conductive member, the first lead-out portion may be a terminal connecting opening portion from which the second conductive member may be configured to be led out toward the outer connection terminal from the first terminal, and the bus bar arranging opening portion and the terminal connecting opening portion may be opening portions that penetrate different portions of the terminal neighboring member in different directions.

With such a configuration, the conductor housing portion forms the bus bar arranging opening portion, the first lead-out portion forms the terminal connecting opening portion, and these two opening portions penetrate the different portions of the terminal neighboring member in the different directions. That is, for example, by opening the conductor housing portion in the direction toward the second energy storage device, the first energy storage device and the second energy storage device can be easily connected to each other through the conductor housing portion. Further, by opening the first lead-out portion in the direction toward the outer connection terminal, the first energy storage device and the outer connection terminal can be easily connected to each other through the first lead-out portion.

The terminal neighboring member may include a wall formed on an outer periphery of the conductor housing portion, wherein the first lead-out portion may be formed on the wall.

With such a configuration, even when the wall is formed on the outer periphery of the conductor housing portion, the first lead-out portion can be easily formed.

The terminal neighboring member may further include a second lead-out portion capable of leading out a third conductive member that connects the outer connection terminal and a third terminal, which a second energy device has, to each other.

With such a configuration, the terminal neighboring member further includes the second lead-out portion capable of leading out the third conductive member which connects the outer connection terminal and the third terminal of the second energy storage device to each other. Accordingly, the second energy storage device can be easily connected to the outer connection terminal at the time of mounting the second energy storage device.

The energy storage apparatus may include an energy storage device housing portion in which the second energy storage device is housed, wherein the energy storage device housing portion may be a housing portion for an energy storage device that is disposed at a position adjacently to the first energy storage device and closest to the outer connection terminal.

With such a configuration, at the time of housing the second energy storage device in the energy storage device housing portion, the second energy storage device can be easily connected to the first energy storage device and the outer connection terminal.

The first terminal and the outer connection terminal may be connected to each other without being connected to the second terminal and the third terminal.

With such a configuration, the first terminal of the first energy storage device and the outer connection terminal are connected to each other without being connected to the second terminal of the second energy storage device and the third terminal respectively. That is, even when the energy storage apparatus is provided with the energy storage device housing portion capable of housing the second energy storage device therein, the first energy storage device and the outer connection terminal are connected to each other in a state where the second energy storage device is not housed in the energy storage device housing portion. Accordingly, in the energy storage apparatus, the number of energy storage devices can be reduced from the number of energy storage devices which can be housed in the energy storage apparatus.

The present invention can be realized not only in the form of an energy storage apparatus but also in the form of a terminal neighboring member disposed adjacently to an electrode terminal of an energy storage device which the energy storage device includes.

The present invention provides an energy storage apparatus which can easily change the number of energy storage devices.

Hereinafter, energy storage apparatuses according to embodiments of the present invention are described with reference to drawings. In the embodiments described hereinafter, numerical values, shapes, materials, constitutional elements, arrangement positions and connection states of the constitutional elements and the like are merely examples, and these are not intended to be used for limiting the present invention. Further, out of the constitutional elements in the embodiments described hereinafter, the constitutional elements which are not described in independent claims describing the uppermost concept are described as arbitrary constitutional elements. The respective drawings are provided for describing the energy storage apparatus, and the energy storage apparatus is not always described in the drawings with strict accuracy.

First Embodiment

First, the configuration of an energy storage apparatus 1 is described.

Figure 2:
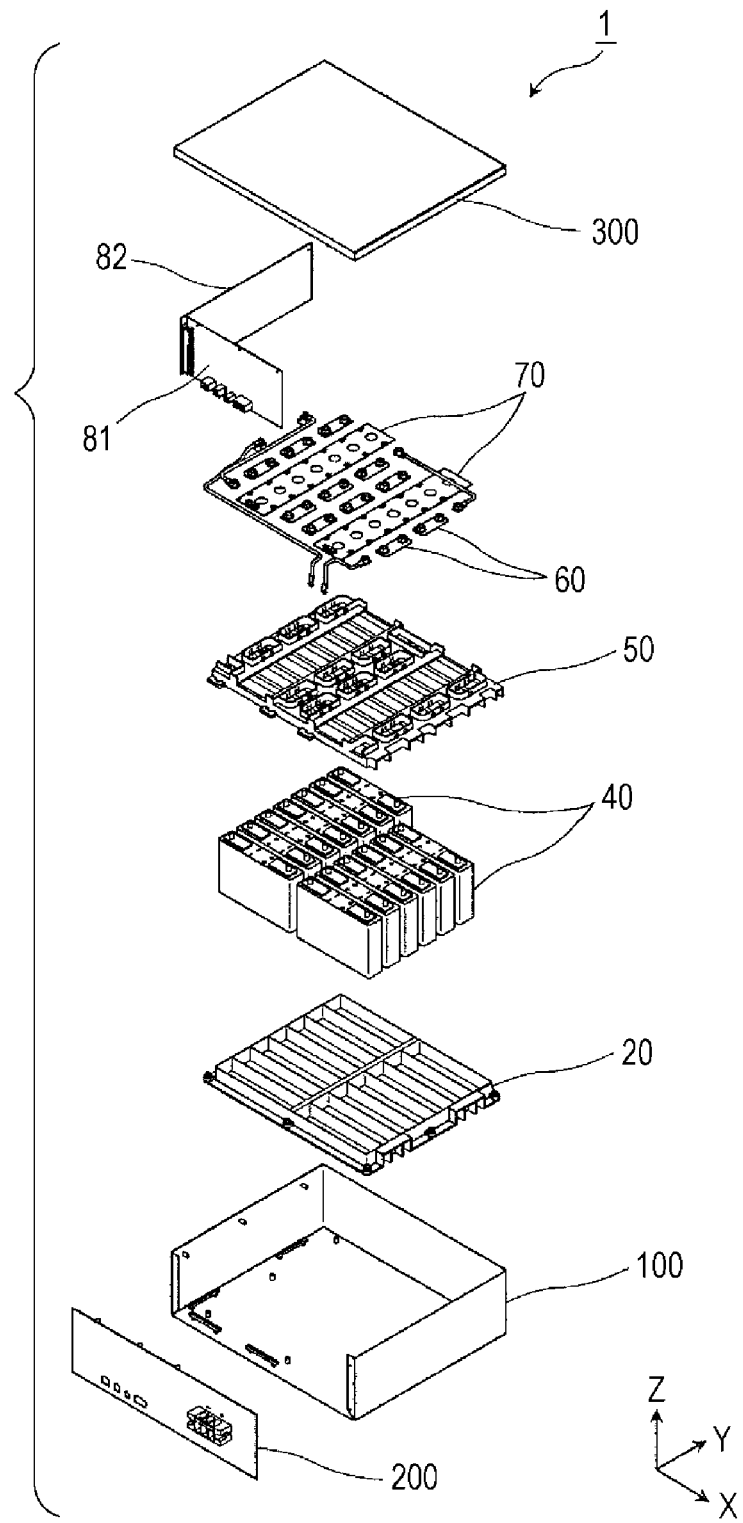
FIG. 2 is an exploded perspective view showing respective constitutional elements in a state where the energy storage apparatus is disassembled.

FIG. 1 is a perspective view showing the external appearance of the energy storage apparatus 1 according to the embodiment of the present invention. FIG. 2 is an exploded perspective view showing respective constitutional elements in a state where the energy storage apparatus 1 is disassembled.

In these drawings, a Z axis direction is indicated as a vertical direction. Although the description will be made hereinafter assuming the Z axis direction as the vertical direction, a case is also considered where the Z axis direction is not assumed as the vertical direction depending on a use mode. Accordingly, the Z axis direction is not limited to the vertical direction. For example, there is no problem in assuming an X axis direction as the vertical direction.

The energy storage apparatus 1 is an apparatus capable of charging electricity into an inner space therein from the outside and discharging electricity to the outside. For example, the energy storage apparatus 1 may be a battery module used in electricity storage application, power source application or the like. Particularly, the energy storage apparatus 1 according to this embodiment is preferably used as an installed-type power source apparatus.

As shown in FIG. 1, the energy storage apparatus 1 includes an exterior unit 10 formed of an exterior body 100, a front wall portion 200 and an upper wall portion 300. As shown in FIG. 2, the energy storage apparatus 1 includes: in the inside of the exterior unit 10, a bottom surface neighboring member 20, energy storage devices 40, a terminal neighboring member 50, bus bars 60, a printed circuit board 70, a measurement printed circuit board 81, and a main printed circuit board 82.

The exterior unit 10 is a container (module case) having a rectangular shape (box shape) which forms an exterior unit of the energy storage apparatus 1. In the exterior unit 10, the energy storage devices 40, the circuit boards (printed circuit board 70, the measurement printed circuit board 81 and the main printed circuit board 82) and the like are disposed at predetermined positions. The exterior unit 10 protects the energy storage devices 40, the respective circuit boards and the like from an impact or the like. The exterior unit 10 is formed using a material having high rigidity such as metal (aluminum, iron or the like, for example). The exterior unit 10 may be formed using a resin material such as polypropylene (PP), polyethylene (PE), polycarbonate (PC), polybutylene terephthalate (PBT) or an ABS resin.

The exterior unit 10 includes the exterior body 100, the front wall portion 200 and the upper wall portion 300. The exterior body 100 is a member which forms a body of the exterior unit 10, and includes a rectangular bottom wall and three rectangular side walls raised from the bottom wall. The exterior body 100 has a shape obtained by bending a plate-like member. The front wall portion 200 is a rectangular plate-like member which forms another side wall of the exterior unit 10. A bottomed rectangular cylindrical member is formed by the exterior body 100 and the front wall portion 200.

The upper wall portion 300 is a member which forms an upper wall (lid) of the exterior unit 10. The upper wall portion 300 is a rectangular plate-like member which closes an opening of the bottomed rectangular cylindrical member formed of the exterior body 100 and the front wall portion 200. That is, the opening portion is closed by the upper wall portion 300 in a state where the energy storage devices 40, the circuit boards (the printed circuit board 70, the measurement printed circuit board 81 and the main printed circuit board 82) and the like are disposed in the inside of the exterior body 100 and the front wall portion 200.

The bottom surface neighboring member 20 is a flat rectangular member disposed on a bottom surface side of the energy storage devices 40, and the bottom surface neighboring member 20 supports the energy storage devices 40 from below. The bottom surface neighboring member 20 is placed on a bottom wall of the exterior body 100 and is mounted on and fixed to the bottom wall thus supporting the energy storage devices 40 with respect to the exterior unit 10 at predetermined positions.

To be more specific, the bottom surface neighboring member 20 is formed using an insulating material. The energy storage devices 40 are fixed in the inside of the exterior unit 10 by being inserted into recessed portions formed on an upper surface of the bottom surface neighboring member 20. With such a configuration, the bottom surface neighboring member 20 prevents the energy storage devices 40 from coming into contact with an electrically conductive member such as the exterior unit 10, and protects the energy storage devices 40 and the like from vibrations, an impact or the like.

Any insulating material may be used for forming the bottom surface neighboring member 20. However, it is preferable to form the bottom surface neighboring member 20 using a resin having high heat resistance such as polybutylene terephthalate reinforced by glass fibers (GF reinforced PBT) or polyphenylene sulfide (PPS), for example. With such a configuration, even when the energy storage device 40 generates heat, it is possible to suppress the occurrence of a case where the bottom surface neighboring member 20 is damaged so that the energy storage device 40 affects other energy storage devices 40. Provided that the insulation of the energy storage devices 40 can be ensured, the bottom surface neighboring member 20 may not be formed of an insulating material.

The energy storage device 40 is a secondary battery (battery) which can charge electricity or discharge electricity. To be more specific, the energy storage device 40 is a nonaqueous electrolyte secondary battery such as a lithium ion secondary battery. In this embodiment, thirteen energy storage devices 40 are stored in the inside of the exterior unit 10. However, the energy storage apparatus 1 may be configured such that fourteen energy storage devices 40 are stored in the inside of the exterior unit 10 by additionally storing one energy storage device 40 in an open space. The detail of this configuration is described later. The energy storage device 40 is not limited to a nonaqueous electrolyte secondary battery, and may be a secondary battery other than a nonaqueous electrolyte secondary battery or may be a capacitor. The detail of the configuration of the energy storage device 40 is described later.

The terminal neighboring member 50 is a flat rectangular member disposed adjacently to electrode terminals of the energy storage devices 40, and supports the energy storage devices 40 from above. That is, the terminal neighboring member 50 is disposed above the energy storage devices 40, and sandwiches the energy storage devices 40 from both upper and lower sides (Z axis direction) cooperatively with the bottom surface neighboring member 20 thus supporting the energy storage devices 40 with respect to the exterior unit 10 at a predetermined position.

To be more specific, the terminal neighboring member 50 is formed using an insulating material. The energy storage devices 40 are fixed in the inside of the exterior unit 10 by being inserted into recessed portions formed on a lower surface of the terminal neighboring member 50. With such a configuration, the terminal neighboring member 50 prevents the energy storage devices 40 from coming into contact with a conductive member such as the exterior unit 10, and protects the energy storage devices 40 and the like from vibrations, an impact or the like.

The bus bars 60 and the printed circuit board 70 are placed on the terminal neighboring member 50. That is, the terminal neighboring member 50 also has a function of positioning the bus bars 60 and the printed circuit board 70 with respect to the energy storage devices 40 at the time of mounting the bus bars 60 and the printed circuit board 70 to the energy storage devices 40. The terminal neighboring member 50 may be formed using any insulating material. However, from a viewpoint of a cost or the like, it is preferable to form the terminal neighboring member 50 using a resin such as PP, PE, PC or an ABS resin, for example. Provided that the insulation of the energy storage devices 40, the bus bars 60 and the like can be ensured, the terminal neighboring member 50 may not be formed of an insulating material. The detail of the configuration of the terminal neighboring member 50 is described later.

The bus bar 60 is a conductive plate-like members made of metal or the like which is disposed above the terminal neighboring member 50 and electrically connects a plurality of energy storage devices 40. To be more specific, the bus bar 60 connects, between neighboring energy storage devices 40, a positive electrode terminal or a negative electrode terminal of one energy storage device 40 with a negative electrode terminal or a positive electrode terminal of another energy storage device 40. In this embodiment, the bus bars 60 connect thirteen energy storage devices 40 in series.

The printed circuit board 70 is disposed above the terminal neighboring member 50. For detecting a voltage of the energy storage device 40, the printed circuit board 70 includes a wire which has one end thereof connected to the electrode terminal of at least one energy storage device 40 out of the energy storage devices 40 which the energy storage apparatus 1 includes (the positive electrode terminals of all energy storage devices 40 in this embodiment). The printed circuit board 70 has a rectangular shape, and is disposed between the positive electrode terminal and the negative electrode terminal of the energy storage device 40. In this embodiment, two printed circuit boards 70 are disposed. However, the number of the printed circuit boards 70 is not limited. A harness or the like can also be used in place of the printed circuit board 70. However, by connecting the electrode terminals and the measurement printed circuit board 81 using the printed circuit board 70, the wires can be easily routed around and hence, mounting property of parts can be enhanced. The printed circuit board 70 may be configured such that a thermistor is mounted on the printed circuit board 70 so as to detect a temperature of the energy storage device 40.

The measurement printed circuit board 81 and the main printed circuit board 82 are circuit boards which are disposed between the energy storage devices 40 and a side wall of the exterior unit 10. The measurement printed circuit board 81 and the main printed circuit board 82 are connected to at least one energy storage device 40 out of the energy storage devices 40 which the energy storage apparatus 1 includes. Further, the measurement printed circuit board 81 measures a state of the energy storage devices 40 and the main printed circuit board 82 controls the state of the energy storage devices 40. To be more specific, the main printed circuit board 82 is a circuit board on which main circuit parts through which a large electric current flows is mounted, and the main printed circuit board 82 is fixed to an inner surface of a side wall of the exterior unit 10 which opposedly faces a short side surface of a container of the energy storage device 40. The measurement printed circuit board 81 is a circuit board on which peripheral circuit parts through which a small electric current flows are mounted, and the measurement printed circuit board 81 is fixed to an inner surface of a side wall of the exterior unit 10 which opposedly faces a long side surface of the container of the energy storage device 40.

Next, the configuration of the energy storage device 40 is described in detail.

Figure 3:
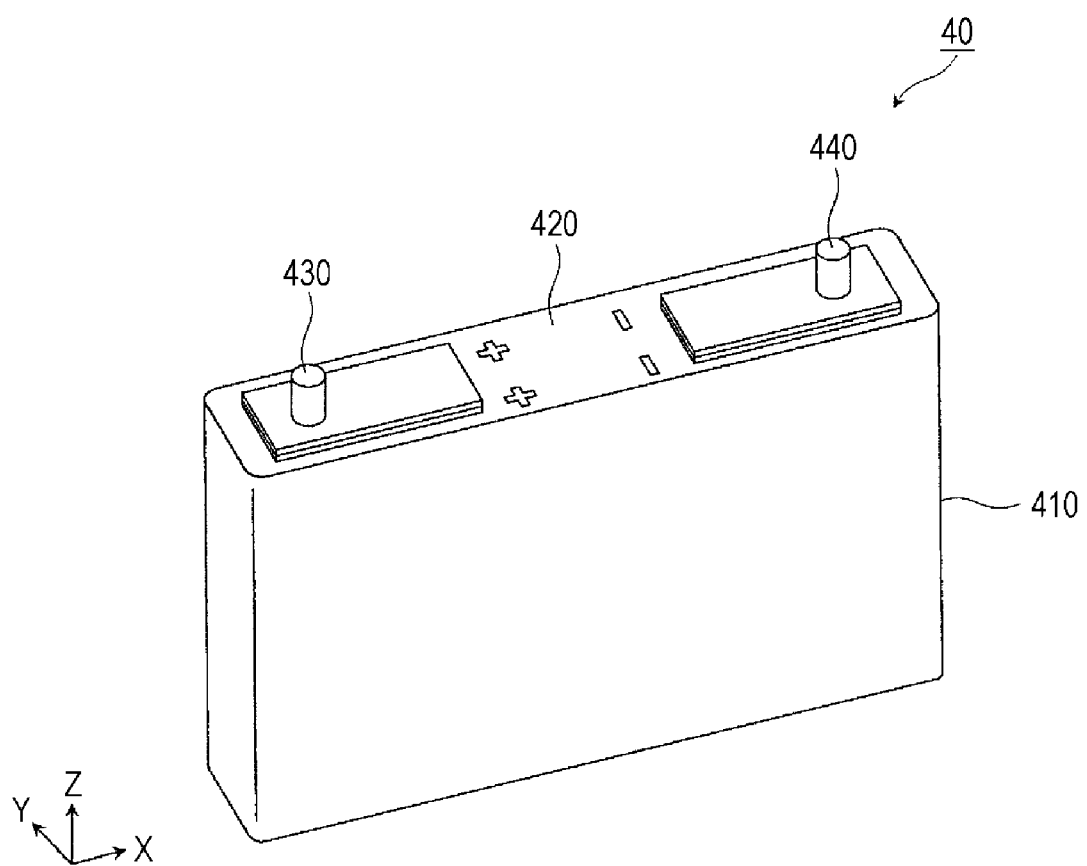
FIG. 3 is a perspective view showing the configuration of the energy storage device.

FIG. 3 is a perspective view showing the configuration of the energy storage device 40.

As shown in FIG. 3, the energy storage device 40 includes a container 410, a positive electrode terminal 430 and a negative electrode terminal 440. The container 410 includes a container lid portion 420. Although an electrode assembly, a positive electrode current collector and a negative electrode current collector are disposed in the inside of the container 410, and a liquid such as an electrolyte solution (nonaqueous electrolyte) is sealed in the container 410, the detailed description of the configuration is omitted.

The container 410 is formed of a casing body made of metal and having a bottomed rectangular cylindrical shape, and a container lid portion 420 made of metal and closing an opening of the casing body. The inside of the container 410 is hermetically sealed by applying welding or the like to the container lid portion 420 and the casing body after the electrode assembly and the like are housed in the inside of the container 410. The container 410 is a parallelepiped container having long side surfaces on side surfaces on both sides thereof in a Y axis direction in FIG. 3, and has short side surfaces on side surfaces on both sides thereof in an X axis direction. Although a material for forming the container 410 is not particularly limited, it is preferable that the container 410 be formed using a weldable metal such as stainless steel or aluminum, for example.

The positive electrode terminal 430 is an electrode terminal which is electrically connected to a positive electrode of the electrode assembly through the positive electrode current collector, and the negative electrode terminal 440 is an electrode terminal which is electrically connected to a negative electrode of the electrode assembly through the negative electrode current collector. Both the positive electrode terminal 430 and the negative electrode terminal 440 are mounted on the container lid portion 420. The positive electrode terminal 430 and the negative electrode terminal 440 are metal made electrode terminals for discharging electricity stored in the electrode assembly to a space outside the energy storage device 40 or for introducing electricity in a space in the inside of the energy storage device 40 for storing electricity in the electrode assembly.

Next, the configuration of the terminal neighboring member 50 is described in detail.

Figure 4:
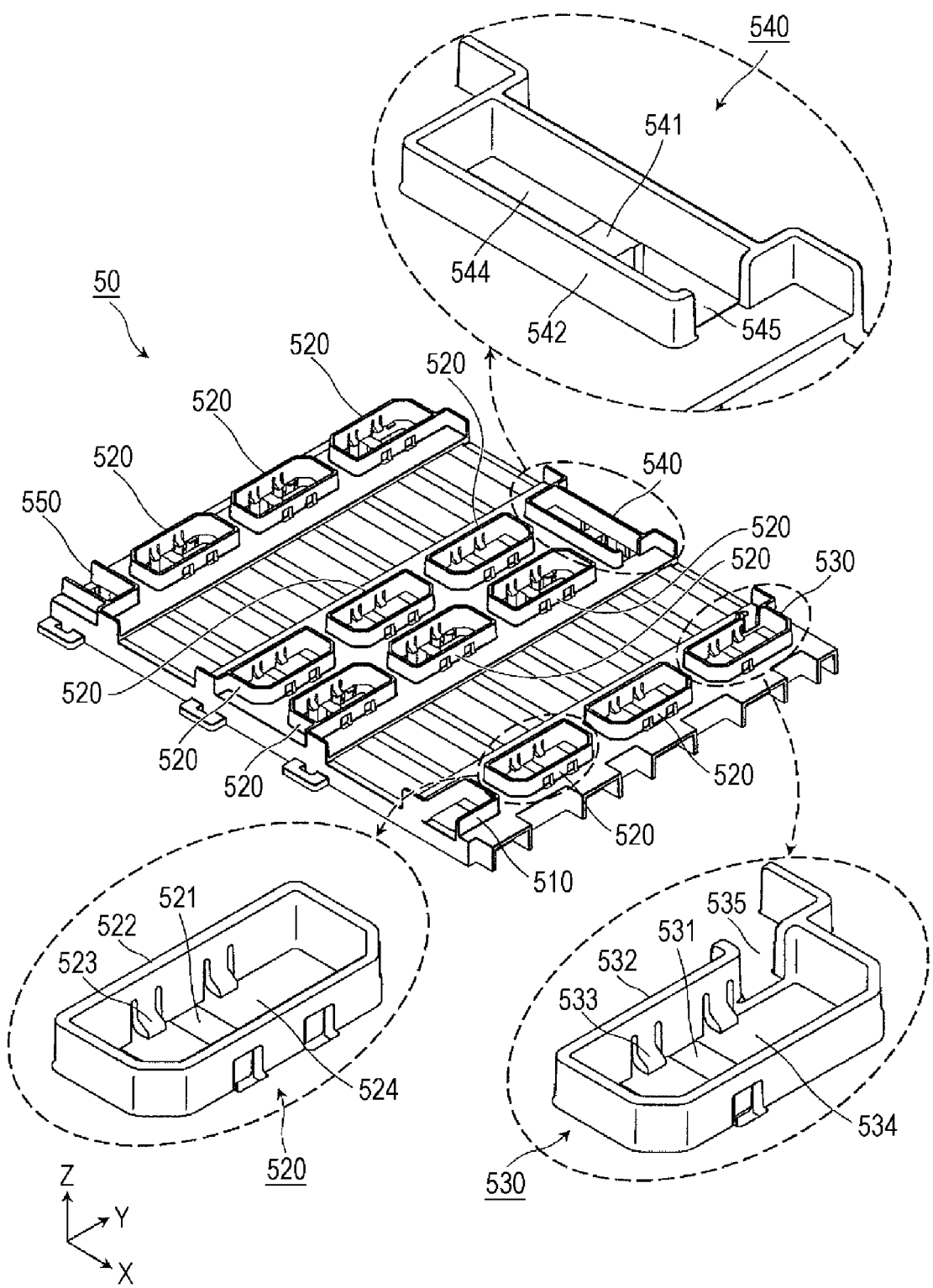
FIG. 4 is a perspective view showing the configuration of a terminal neighboring member.
Figure 5:
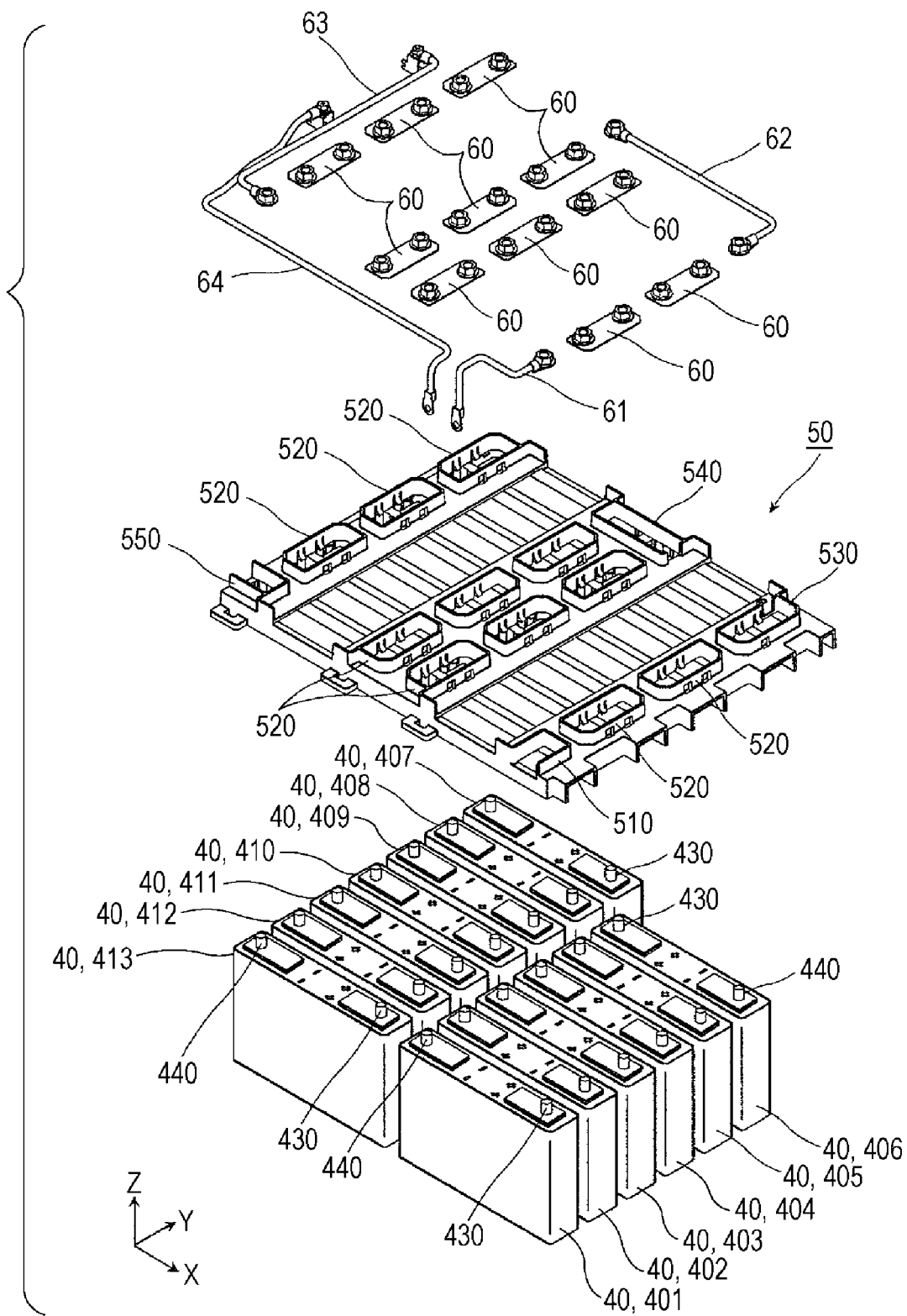
FIG. 5 is a perspective view showing the positional relationship between the terminal neighboring member, the energy storage devices and bus bars.

FIG. 4 is a perspective view showing the configuration of the terminal neighboring member 50. FIG. 5 is a perspective view showing the positional relationship between the terminal neighboring member 50, the energy storage devices 40 and the bus bars 60.

As shown in these drawings, the terminal neighboring member 50 is a member disposed adjacently to a plurality of energy storage devices 40 (thirteen energy storage devices 401 to 413 in this embodiment). A plurality of bus bars 60 (eleven bus bars 60 in this embodiment) and conductive members 61 to 64 are disposed above the terminal neighboring member 50. The terminal neighboring member 50 includes conductor disposing portions 510 to 550.

First, the conductor disposing portions 510 and 550 are described.

The conductor disposing portion 510 is a portion where the conductive member 61 connected to the electrode terminal of the energy storage device 40 is disposed. The conductive member 61 is a member having conductivity which is connected to the positive electrode terminal 430 of the energy storage device 401 disposed at an end portion (an end portion on an X-axis-direction plus side and on a Y-axis-direction minus side) in a plurality of energy storage devices 40. Although the conductive member 61 is formed of a lead wire (metal wire) in this embodiment, the conductive member 61 may be in any form such as a metal rod member or a metal plate-like member.

To be more specific, the conductor disposing portion 510 has a rectangular opening portion where one end portion of the conductive member 61 is disposed. A bolt portion of the positive electrode terminal 430 of the energy storage device 401 is inserted into the opening portion, and one end portion of the conductive member 61 is connected to the positive electrode terminal 430 by a nut. A wall raised upward (Z axis direction) is formed around the opening portion so as to prevent the conductive member 61 from coming into contact with other conductive members. The other end portion of the conductive member 61 is connected to an outer connection terminal on a positive-electrode-side disposed on the front wall portion 200 of the exterior unit 10.

The conductor disposing portion 550 is a portion where the conductive member 63 connected to the electrode terminal of the energy storage device 40 is disposed. The conductive member 63 is a member having conductivity which is connected to the negative electrode terminal 440 of the energy storage device 413 disposed at an end portion (an end portion on an X-axis-direction minus side and on a Y-axis-direction minus side) in the plurality of energy storage devices 40. Although the conductive member 63 is formed of a lead wire (metal wire) in this embodiment, the conductive member 63 may be in any form such as a metal rod member or a metal plate-like member.

To be more specific, the conductor disposing portion 550 has a rectangular opening portion where one end portion of the conductive member 63 is disposed. A bolt portion of the negative electrode terminal 440 of the energy storage device 413 is inserted into the opening portion, and one end portion of the conductive member 63 is connected to the negative electrode terminal 440 by a nut. A wall raised upward (Z axis direction) is formed around the opening portion so as to prevent the conductive member 63 from coming into contact with other conductive members. The other end portion of the conductive member 63 is connected to an outer connection terminal on a negative-electrode-side disposed on the front wall portion 200 of the exterior unit 10.

Next, the conductor disposing portions 520 are described.

The conductor disposing portion 520 is a portion where the bus bar 60 which connects electrode terminals of two energy storage devices 40 to each other is disposed. The bus bar 60 is a conductive member which connects the positive electrode terminal 430 and the negative electrode terminal 440 of the neighboring energy storage devices 40 in a plurality of energy storage devices 40. To be more specific, the conductor disposing portion 520 includes a placing portion 521, a wall portion 522 and projecting portions 523. A housing portion 524 which is an opening portion is formed by the wall portion 522.

The placing portion 521 is a flat-plate-like portion on which the bus bar 60 is placed. The projecting portions 523 are portions which project inward in the housing portion 524 from an inner surface of the wall portion 522. The projecting portions 523 are disposed above the bus bar 60. The projecting portions 523 fix the bus bar 60 in the inside of the housing portion 524 by sandwiching the bus bar 60 cooperatively with the placing portion 521.

The wall portion 522 is an annular wall which surrounds an outer periphery of the bus bar 60 when the bus bar 60 is placed on the placing portion 521. The wall portion 522 is disposed in a raised manner toward an upper side (Z axis direction). The wall portion 522 is formed along an outer peripheral shape of the bus bar 60. With such a configuration, the wall portion 522 prevents the bus bar 60 from coming into contact with other conductive members, and also plays a role of a guide used for disposing the bus bar 60.

The wall portion 522 has a hexagonal shape obtained by chamfering two corner portions of a rectangular shape as viewed from above (Z axis direction). The bus bar 60 has the same hexagonal outer peripheral shape as the wall portion 522. The outer peripheral shape of the bus bar 60 is not in rotational symmetry and the wall portion 522 is formed along the outer peripheral shape of the bus bar 60. Accordingly, it is also possible to prevent the bus bar 60 from being disposed in a wrong direction.

The housing portion 524 is a space (opening portion) surrounded by the wall portion 522, and the bus bar 60 is housed in the housing portion 524. In other words, the wall portion 522 is formed on the outer periphery of the housing portion 524. The housing portion 524 has the same outer peripheral shape as the bus bar 60 as viewed from above (Z axis direction).

The positive electrode terminal 430 and the negative electrode terminal 440 of the neighboring energy storage devices 40 are inserted into the housing portion 524, and the bus bar 60 is connected to the positive electrode terminal 430 and the negative electrode terminal 440. A bolt portion of the positive electrode terminal 430 is inserted into the housing portion 524, and one end portion of the bus bar 60 is connected to the positive electrode terminal 430 by a nut. A bolt portion of the negative electrode terminal 440 is inserted into the housing portion 524, and the other end portion of the bus bar 60 is connected to the negative electrode terminal 440 by a nut.

Next, the conductor disposing portion 530 is described.

The conductor disposing portion 530 is a portion where the conductive member 62 or the bus bar 60 connected to the electrode terminal of the energy storage device 40 is disposed. In this embodiment, the conductive member 62 is disposed in the conductor disposing portion 530.

The conductive member 62 is a conductive member which is connected to a negative electrode terminal 440 of the energy storage device 406 disposed at an end portion on an X axis direction plus side and on a Y axis direction plus side in a plurality of energy storage devices 40, and a positive electrode terminal 430 of the energy storage device 407 disposed at an end portion on an X axis direction minus side and on a Y axis direction plus side in the plurality of energy storage devices. That is, the conductive member 62 is a member which connects two energy storage devices 40 which are not disposed adjacently to each other. Although the conductive member 62 is formed of a lead wire (metal wire) in this embodiment, the conductive member 62 may be in any form such as a metal rod member or a metal plate-like member.

The conductor disposing portion 530 includes a placing portion 531, a wall portion 532 and projecting portions 533. A first housing portion 534 is formed by the wall portion 532. A first lead-out portion 535 is formed in the wall portion 532.

The conductor disposing portion 530 differs from the conductor disposing portion 520 with respect to a point that the first lead-out portion 535 is formed in the wall portion 532. However, the configurations of the placing portion 531, the wall portion 532, the projecting portions 533 and the first housing portion 534 of the conductor disposing portion 530 are substantially equal to the configurations of the placing portion 521, the wall portion 522, the projecting portions 523 and the housing portion 524 of the conductor disposing portion 520. Hereinafter, the detail of the configurations of the placing portion 531, the wall portion 532, the projecting portions 533 and the first housing portion 534 is described in a simplified manner.

The placing portion 531 is a flat-plate-like portion on which the bus bar 60 can be placed. The projecting portions 533 are portions which project inward in the first housing portion 534 from an inner surface of the wall portion 532. The projecting portions 533 are formed such that the projecting portions 533 can be disposed above the bus bar 60 when the bus bar 60 is placed on the placing portion 531. That is, the projecting portions 533 can fix the bus bar 60 in the inside of the first housing portion 534 by sandwiching the bus bar 60 cooperatively with the placing portion 531. In this embodiment, the bus bar 60 is not disposed.

The wall portion 532 is an annular wall which surrounds an outer periphery of the bus bar 60 when the bus bar 60 is placed on the placing portion 531. The wall portion 532 is disposed in a raised manner toward an upper side (Z axis direction). The first housing portion 534 is a space (opening portion) which can house the bus bar 60 therein, and is surrounded by the wall portion 532. That is, the wall portion 532 is formed on the outer periphery of the first housing portion 534, and the bus bar 60 can be disposed in the inside of the first housing portion 534. As described above, the bus bar 60 is not disposed in this embodiment.

The first lead-out portion 535 is a rectangular opening formed so as to allow the leading out of the conductive member 62 from the first housing portion 534. To be more specific, the first lead-out portion 535 is formed by cutting away a portion of the wall portion 532 on an X-axis direction minus side in a rectangular shape, and the conductive member 62 can be disposed in the first lead-out portion 535.

The first housing portion 534 and the first lead-out portion 535 formed in the terminal neighboring member 50 are formed of opening portions which penetrate the different portions of the terminal neighboring member 50 in the different directions. The first housing portion 534 is an opening portion formed such that the first housing portion 534 penetrates the conductor disposing portion 530 in a Z axis direction, and the first lead-out portion 535 is an opening portion formed such that the first lead-out portion 535 penetrates the wall portion 532 of the conductor disposing portion 530 in an X axis direction.

The first lead-out portion 535 may be formed such that the first lead-out portion 535 penetrates the wall portion 532 on an X-axis direction plus side in an X axis direction, or the first lead-out portion 535 may be formed such that the first lead-out portion 535 penetrates the wall portion 532 on a Y-axis direction plus side or a Y-axis direction minus side in a Y axis direction. The first lead-out portion 535 is not limited to a rectangular cut-away portion, and may be a cut-away portion having any shape such as a semicircular shape, or may be a through hole having a rectangular shape, a circular shape or the like in place of a cut-away portion.

Next, the conductor disposing portion 540 is described.

The conductor disposing portion 540 is a portion where the conductive member 62 or the bus bar connected to the electrode terminal of the energy storage device 40 is disposed. In this embodiment, the conductive member 62 is disposed in the conductor disposing portion 540. To be more specific, the conductor disposing portion 540 includes a placing portion 541 and a wall portion 542, and a second housing portion 544 is formed by the wall portion 542. A second lead-out portion 545 is formed on the wall portion 542.

The placing portion 541 is a flat-plate-like portion on which the bus bar can be placed. The wall portion 542 is an annular wall which surrounds an outer periphery of the bus bar when the bus bar is placed on the placing portion 541. The wall portion 542 is disposed in a raised manner toward an upper side (Z axis direction). The second housing portion 544 is a space (opening portion) which can house the bus bar therein, and is surrounded by the wall portion 542. That is, the wall portion 542 is formed on the outer periphery of the second housing portion 544, and the bus bar can be disposed in the inside of the second housing portion 544. The bus bar is not disposed in this embodiment.

The second lead-out portion 545 is a rectangular opening formed so as to allow the leading out of the conductive member 62 from the second housing portion 544. To be more specific, the second lead-out portion 545 is formed by cutting away a portion of the wall portion 542 on an X-axis direction plus side in a rectangular shape, and the conductive member 62 can be disposed in the second lead-out portion 545.

The second housing portion 544 and the second lead-out portion 545 formed in the terminal neighboring member 50 are formed of opening portions which penetrate the different portions of the terminal neighboring member 50 in the different directions. That is, the second housing portion 544 is an opening portion formed such that the second housing portion 544 penetrates the conductor disposing portion 540 in a Z axis direction, and the second lead-out portion 545 is an opening portion formed such that the second lead-out portion 545 penetrates the wall portion 542 of the conductor disposing portion 540 in an X axis direction.

The second lead-out portion 545 may be formed such that the second lead-out portion 545 penetrates the wall portion 542 on an X-axis direction minus side in an X axis direction, or the second lead-out portion 545 may be formed such that the second lead-out portion 545 penetrates the wall portion 542 on a Y-axis direction plus side or a Y-axis direction minus side in a Y axis direction. The second lead-out portion 545 is not limited to a rectangular cut-away portion, and may be a cut-away portion having any shape such as a semicircular shape, or may be a through hole having a rectangular shape, a circular shape or the like in place of a cut-away portion.

Next, the configuration for connecting a plurality of energy storage devices 40 (energy storage devices 401 to 413) using the bus bars 60 and conductive members 61 to 64 is specifically described.

Figure 6:
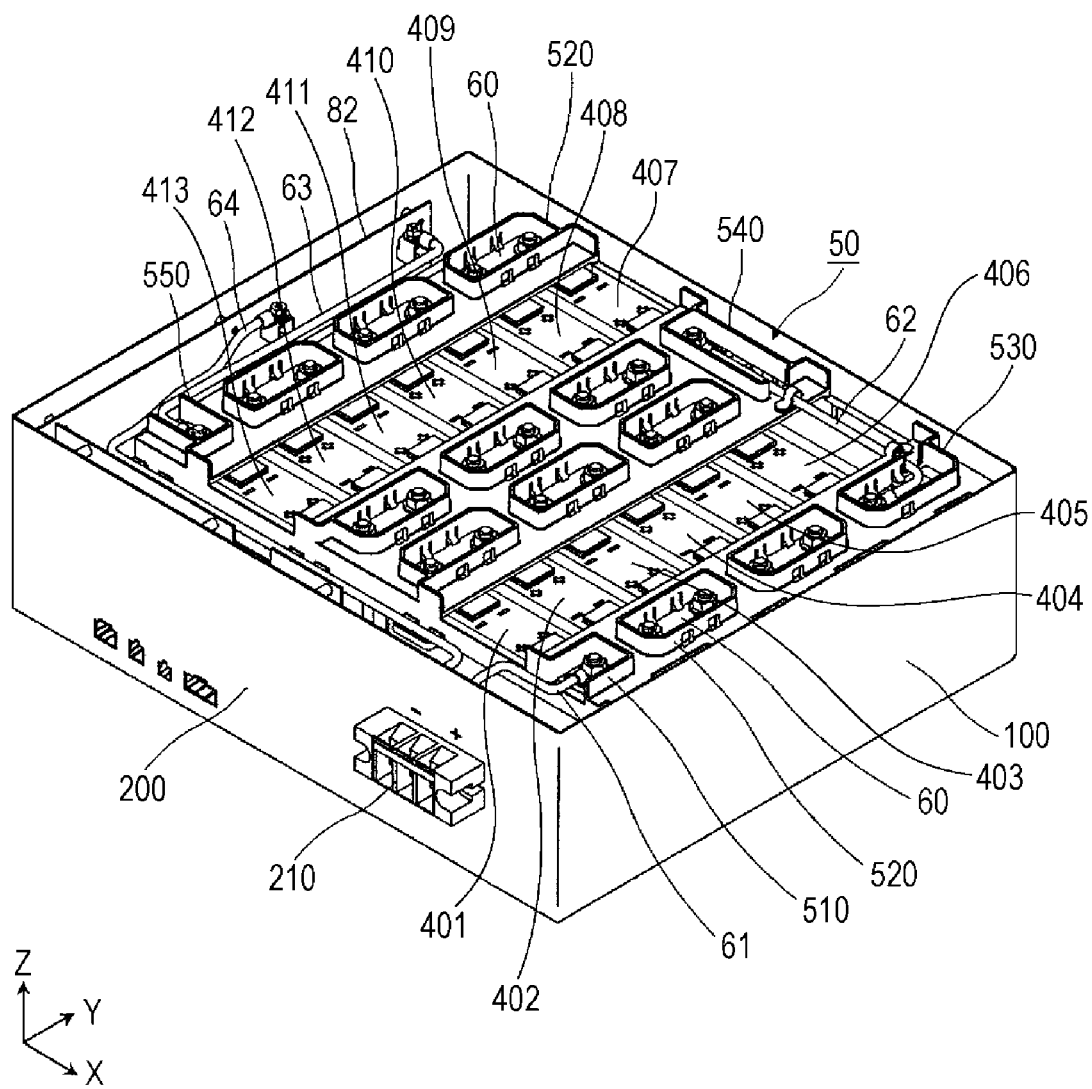
FIG. 6 is a perspective view showing the configuration where a plurality of energy storage devices are connected to each other by a bus bar and a conductive member.

FIG. 6 is a perspective view showing the configuration where the plurality of energy storage devices 40 are connected to each other by the bus bars 60 and the conductive members 61 to 64. To be more specific, FIG. 6 is a perspective view showing the configuration where the upper wall portion 300 and the printed circuit board 70 are removed from the energy storage apparatus 1 shown in FIG. 1.

Figure 7:
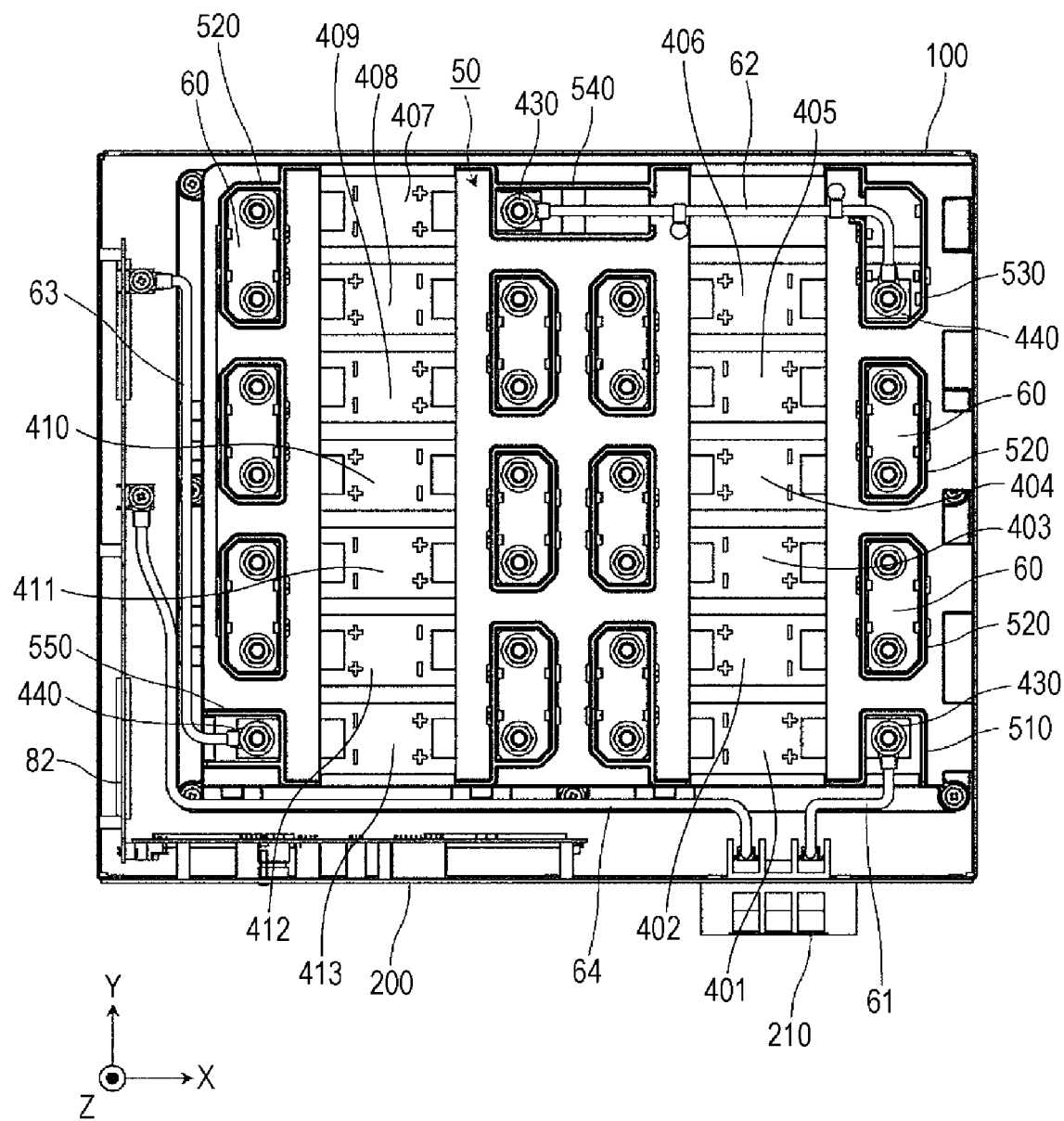
FIG. 7 is a plan view showing the configuration where the plurality of energy storage devices are connected to each other by the bus bar and the conductive member.

FIG. 7 is a plan view showing the configuration where the plurality of energy storage devices 40 are connected to each other by the bus bars 60 and the conductive members 61 to 64. That is, FIG. 7 is an upper plan view of the configuration shown in FIG. 6 as viewed from a Z-axis direction plus side.

An outer connection terminal 210 is a terminal for connecting the energy storage apparatus 1 with the outside of the energy storage apparatus 1. The outer connection terminal 210 has a positive-electrode-side terminal and a negative-electrode-side terminal. The positive-electrode-side terminal of the outer connection terminal 210 mounted on the front wall portion 200 and the positive electrode terminal 430 of the energy storage device 401 are connected to each other by the conductive member 61 disposed in the conductor disposing portion 510. The negative electrode terminal 440 of the energy storage device 401 and the positive electrode terminal 430 of the energy storage device 402 are connected to each other by the bus bar 60 disposed in the conductor disposing portion 520. Such connection is established up to the positive electrode terminal 430 of the energy storage device 406 in the same manner.

The negative electrode terminal 440 of the energy storage device 406 and the positive electrode terminal 430 of the energy storage device 407 are connected to each other by the conductive member 62 disposed in the conductor disposing portions 530, 540. The negative electrode terminal 440 of the energy storage device 407 and the positive electrode terminal 430 of the energy storage device 408 are connected to each other by the bus bar 60 disposed in the conductor disposing portion 520. Such connection is established up to the positive electrode terminal 430 of the energy storage device 413 in the same manner.

The negative electrode terminal 440 of the energy storage device 413 and the main printed circuit board 82 are connected to each other by the conductive member 63 disposed in the conductor disposing portion 550. The main printed circuit board 82 and the negative-electrode-side terminal of the outer connection terminal 210 mounted on the front wall portion 200 are connected to each other by the conductive member 64. Although the conductive member 64 is formed of a lead wire (metal wire) in this embodiment, the conductive member 64 may be in any form such as a metal rod member or a metal plate-like member.

As described above, the energy storage apparatus 1 adopts the configuration where the energy storage apparatus 1 includes thirteen energy storage devices 40. However, the energy storage apparatus 1 can change the configuration such that the energy storage apparatus 1 includes fourteen energy storage devices 40. Hereinafter, the configuration of the energy storage apparatus 1 is described where the energy storage apparatus 1 includes fourteen energy storage devices 40.

Figure 8:
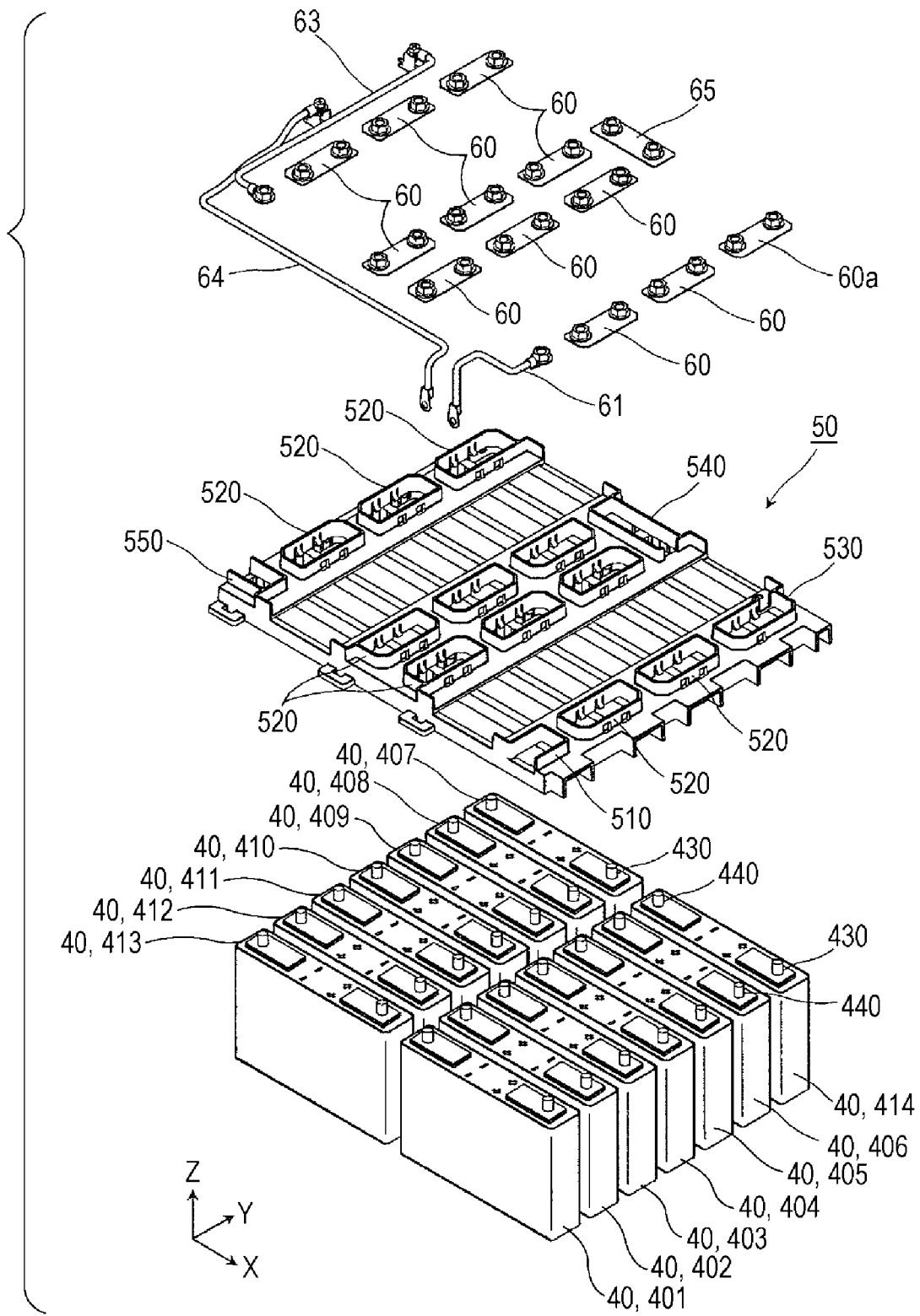
FIG. 8 is a perspective view showing the configuration of the energy storage apparatus when the energy storage apparatus includes fourteen energy storage devices.
Figure 9:
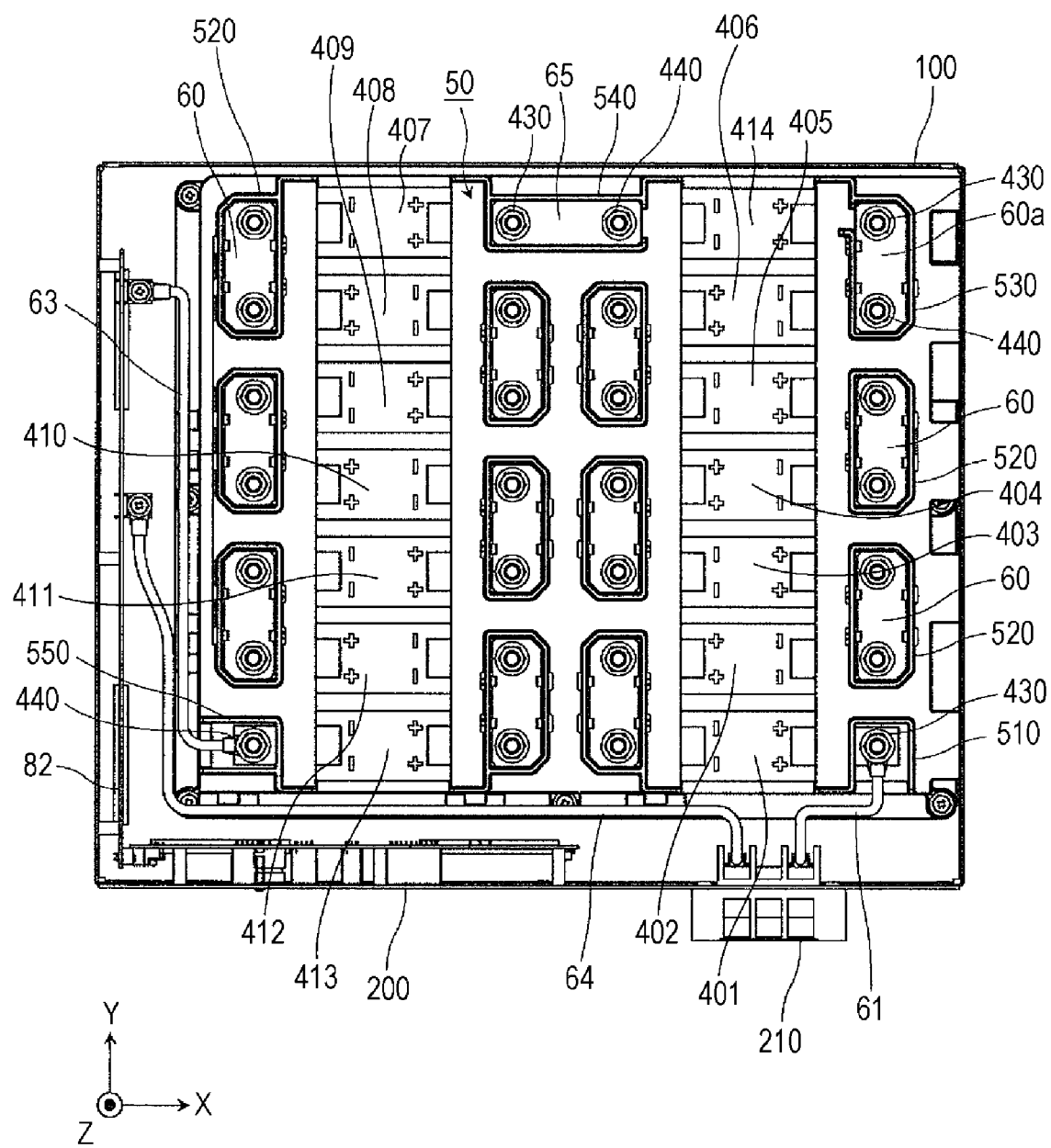
FIG. 9 is a plan view showing the configuration of the energy storage apparatus when the energy storage apparatus includes fourteen energy storage devices.

FIG. 8 is a perspective view showing the configuration of the energy storage apparatus 1 when the energy storage apparatus 1 includes fourteen energy storage devices 40. FIG. 8 is a view which corresponds to FIG. 5. FIG. 9 is a plan view showing the configuration of the energy storage apparatus 1 when the energy storage apparatus 1 includes fourteen energy storage devices 40. FIG. 9 is a view which corresponds to FIG. 7.

As shown in these drawings, the energy storage apparatus 1 includes bus bars 60a and 65 in place of the conductive members 62. An energy storage device 414 is added to the energy storage apparatus 1 so that the energy storage apparatus 1 includes fourteen energy storage devices 40 (energy storage devices 401 to 414).

The bus bar 60a has the same shape as the bus bar 60, and connects the negative electrode terminal 440 of the energy storage device 406 and a positive electrode terminal 430 of the energy storage device 414 to each other. To be more specific, the bus bar 60a is placed on the placing portion 531 of the conductor disposing portion 530, and is fixed in the first housing portion 534 by the projecting portions 533.

The positive electrode terminal 430 and the negative electrode terminal 440 of the neighboring energy storage devices 40 are inserted into the first housing portion 534, and the bus bar 60a is connected to the positive electrode terminal 430 and the negative electrode terminal 440. To be more specific, a bolt portion of the negative electrode terminal 440 of the energy storage device 406 is inserted into the first housing portion 534, and one end portion of the bus bar 60a is connected to the negative electrode terminal 440 by a nut. Further, a bolt portion of the positive electrode terminal 430 of the energy storage device 414 is inserted into the first housing portion 534, and the other end portion of the bus bar 60a is connected to the positive electrode terminal 430 by a nut.

The bus bar 65 is a rectangular bus bar, and connects the negative electrode terminal 440 of the energy storage device 414 and the positive electrode terminal 430 of the energy storage device 407 to each other. To be more specific, the bus bar 65 is placed on the placing portion 541 of the conductor disposing portion 540, and is fixed in the second housing portion 544.

The wall portion 542 of the conductor disposing portion 540 is formed along an outer peripheral shape of the bus bar 65. With such a configuration, the wall portion 542 prevents the bus bar 65 from coming into contact with other conductive members, and also plays a role of a guide used for disposing the bus bar 65. The wall portion 542 has a rectangular shape as viewed from above (Z axis direction), and an outer peripheral shape of the bus bar 65 is formed into the same rectangular shape as the wall portion 542. The second housing portion 544 has the same outer peripheral shape as the bus bar 65 as viewed from above (Z axis direction).

The positive electrode terminal 430 and the negative electrode terminal 440 of the neighboring energy storage devices 40 are inserted into the second housing portion 544, and the bus bar 65 is connected to the positive electrode terminal 430 and the negative electrode terminal 440. A bolt portion of the negative electrode terminal 440 of the energy storage device 414 is inserted into the second housing portion 544, and one end portion of the bus bar 65 is connected to the negative electrode terminal 440 by a nut. Further, a bolt portion of the positive electrode terminal 430 of the energy storage device 407 is inserted into the second housing portion 544, and the other end portion of the bus bar 65 is connected to the positive electrode terminal 430 by a nut.

The negative electrode terminal 440 of the energy storage device 406 and the positive electrode terminal 430 of the energy storage device 414 are connected to each other by the bus bar 60a disposed in the conductor disposing portion 530. Further, the negative electrode terminal 440 of the energy storage device 414 and the positive electrode terminal 430 of the energy storage device 407 are connected to each other by the bus bar 65 disposed in the conductor disposing portion 540.

With such a configuration, the energy storage device 406 (first energy storage device) and the energy storage device 414 (a second energy storage device which differs from a first energy storage device) are disposed at positions adjacently to each other, and the energy storage device 406 (first energy storage device) and the energy storage device 407 (a third energy storage device which differs from the first energy storage device and the second energy storage device) are disposed at positions which are not the positions adjacently to each other.

The first housing portion 534 of the conductor disposing portion 530 is formed such that the bus bar 60a (first conductive member) which connects the negative electrode terminal 440 of the energy storage device 406 (the first terminal which the first energy storage device includes) and the positive electrode terminal 430 of the energy storage device 414 (the second terminal which the second energy storage device includes) to each other can be disposed.

The first lead-out portion 535 of the conductor disposing portion 530 is formed such that the conductive member 62 (second conductive member) which connects the negative electrode terminal 440 of the energy storage device 406 (the first terminal which the first energy storage device includes) and the positive electrode terminal 430 of the energy storage device 407 (the third terminal which the third energy storage device includes) to each other can be disposed.

The second housing portion 544 of the conductor disposing portion 540 is formed such that the bus bar 65 (third conductive member) which connects the positive electrode terminal 430 of the energy storage device 407 (the third terminal which the third energy storage device includes) and the negative electrode terminal 440 of the energy storage device 414 (the fourth terminal which is a terminal different from the second terminal of the second energy storage device) to each other can be disposed.

The second lead-out portion 545 of the conductor disposing portion 540 is formed such that the second lead-out portion 545 is disposed closer to the second housing portion 544 than to the first lead-out portion 535, and the conductive member 62 (second conductive member) can be disposed in the second lead-out portion 545.

In the case where the energy storage apparatus 1 includes thirteen energy storage devices 40, the energy storage apparatus 1 is provided with the conductive member 62 (second conductive member) without being provided with the energy storage device 414 (second energy storage device), the bus bar 60a (first conductive member) and the bus bar 65.

On the other hand, in the case where the energy storage apparatus 1 includes fourteen energy storage devices 40, the energy storage apparatus 1 is provided with the energy storage device 414 (second energy storage device), the bus bar 60a (first conductive member) and the bus bar 65 without being provided with the conductive member 62 (second conductive member).

As described above, according to the energy storage apparatus 1 of the embodiment of the present invention, the terminal neighboring member 50 includes: the first housing portion 534 capable of housing the first conductive member which connects the first terminal of the first energy storage device and the second terminal of the second energy storage device to each other; and the first lead-out portion 535 capable of leading out the second conductive member which connects the first terminal and the third terminal of the third energy storage device to each other from the first housing portion 534. That is, the second energy storage device can be connected to the first energy storage device by disposing the first conductive member in the first housing portion 534, and the third energy storage device can be connected to the first energy storage device by disposing the second conductive member in the first lead-out portion 535. Accordingly, for example, by removing the second energy storage device from a state where the second energy storage device is connected to the first energy storage device and the third energy storage device is connected to the second energy storage device and by connecting the third energy storage device to the first energy storage device, the number of energy storage devices 40 can be reduced. According to the energy storage apparatus 1, the energy storage device 40 can be easily mounted and easily removed and hence, the number of energy storage devices 40 can be easily changed. Further, the terminal neighboring member 50, the exterior unit 10 and the like can be used in common even when the number of energy storage devices 40 is changed and hence, the energy storage apparatuses 1 which differ in number of energy storage devices 40 can be formed at a low cost.

The first housing portion 534 and the first lead-out portion 535 formed in the terminal neighboring member 50 are formed of the opening portions which penetrate the different portions of the terminal neighboring member 50 in the different directions. That is, by opening the first housing portion 534 and the first lead-out portion 535 such that the first housing portion 534 and the first lead-out portion 535 are directed in the direction toward the second energy storage device and in the direction toward the third energy storage device, the first energy storage device and the second energy storage device can be easily connected to each other through the first housing portion 534, and the first energy storage device and the third energy storage device can be easily connected to each other through the first lead-out portion 535.

In the terminal neighboring member 50, the wall portion 532 is formed on the outer periphery of the first housing portion 534, and the first lead-out portion 535 is formed in the wall portion 532 and hence, even when the wall portion 532 is formed on the outer periphery of the first housing portion 534, the first lead-out portion 535 can be formed easily.

The terminal neighboring member 50 includes: the second housing portion 544 capable of housing the third conductive member which connects the third energy storage device and the second energy storage device to each other; and the second lead-out portion 545 capable of leading out the second conductive member which connects the third energy storage device and the first energy storage device to each other from the second housing portion 544. Accordingly, for example, by removing the second energy storage device from a state where the second energy storage device is connected to the third energy storage device and the first energy storage device is connected to the second energy storage device and by connecting the first energy storage device to the third energy storage device, the number of energy storage devices 40 can be reduced. According to the energy storage apparatus 1, the energy storage device 40 can be easily mounted and easily removed and hence, the number of energy storage devices 40 can be easily changed.

The energy storage apparatus 1 has the configuration where the first energy storage device and the third energy storage device which is not disposed adjacently to the first energy storage device are connected to each other by the second conductive member. That is, although the energy storage devices 40 which are disposed adjacently to each other are connected to each other usually, according to the energy storage apparatus 1, the energy storage devices 40 which are not disposed adjacently to each other can be connected to each other. In this manner, according to the energy storage apparatus 1, the degree of freedom in the arrangement of the energy storage devices 40 can be increased.

Although the energy storage apparatus 1 according to the embodiment of the present invention has been described heretofore, the present invention is not limited to the above-mentioned embodiment. That is, it should be construed that the embodiment disclosed this time is only for exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention. Further, configurations formed by combining constitutional elements included in the above-mentioned embodiment as desired also fall within the scope of the present invention.

For example, in the above-mentioned embodiment, to dispose the conductive member 62 which connects the energy storage device 406 and the energy storage device 407 when the energy storage device 414 is removed, the first lead-out portion 535 is formed in the conductor disposing portion 530, and the second lead-out portion 545 is formed in the conductor disposing portion 540. It is not always necessary that both the first lead-out portion 535 and the second lead-out portion 545 are formed. That is, it is sufficient that either one of the first lead-out portion 535 or the second lead-out portion 545 is not formed. The energy storage device which can be removed is not limited to the energy storage device 414, and the energy storage device which can be removed may be any one of the plurality of energy storage devices 40. In this case, a lead-out portion for leading out a conductive member is formed in the conductor disposing portion which corresponds to the energy storage device which can be removed.

In the above-mentioned embodiment, the first housing portion 534 and the first lead-out portion 535 are formed of opening portions which penetrate the different portions of the terminal neighboring member 50 in the different directions. The second housing portion 544 and the second lead-out portion 545 are also formed of opening portions which penetrate the different portions of the terminal neighboring member 50 in the different directions. However, the first housing portion 534 and the first lead-out portion 535 may be formed of opening portions which penetrate the different portions of the terminal neighboring member 50 in the same direction. Alternatively, the second housing portion 544 and the second lead-out portion 545 may be formed of opening portions which penetrate the different portions of the terminal neighboring member 50 in the same direction.

In the above-mentioned embodiment, the first lead-out portion 535 is formed in the wall portion 532 of the conductor disposing portion 530, and the second lead-out portion 545 is formed in the wall portion 542 of the conductor disposing portion 540. However, the first lead-out portion 535 may be formed in a portion other than the wall portion 532, and the second lead-out portion 545 may be formed in a portion other than the wall portion 542.

In the above-mentioned embodiment, the energy storage apparatus 1 has the configuration where the number of energy storage devices 40 which the energy storage apparatus 1 includes can be changed to 13 pieces from 14 pieces by decreasing 1 piece. However, the number of energy storage devices 40 which can be changed in the energy storage apparatus 1 is not particularly limited. For example, the energy storage apparatus 1 may have the configuration where the number of energy storage devices 40 can be changed to 12 pieces from 14 pieces by decreasing 2 pieces, or the energy storage apparatus 1 may have the configuration where the number of energy storage devices 40 can be changed to other numbers. These configurations can be realized by forming the first lead-out portions and the second lead-out portions in the terminal neighboring member. The number of energy storage devices 40 before the number is decreased is not limited to 14 pieces, and any number may be adopted as such an initial number. In the above-mentioned embodiment, the energy storage devices 40 are arranged in two rows (the rows consisting of the row formed of the energy storage devices 401 to 406 (and 414) and the row formed of the energy storage devices 407 to 413). However, the energy storage devices 40 may be arranged in three or more rows.

Second Embodiment

Next, the configuration of a terminal neighboring member 50 according to the second embodiment is described in detail. Same symbols are given to parts which are substantially equal to the parts used in the first embodiment.

Figure 10:
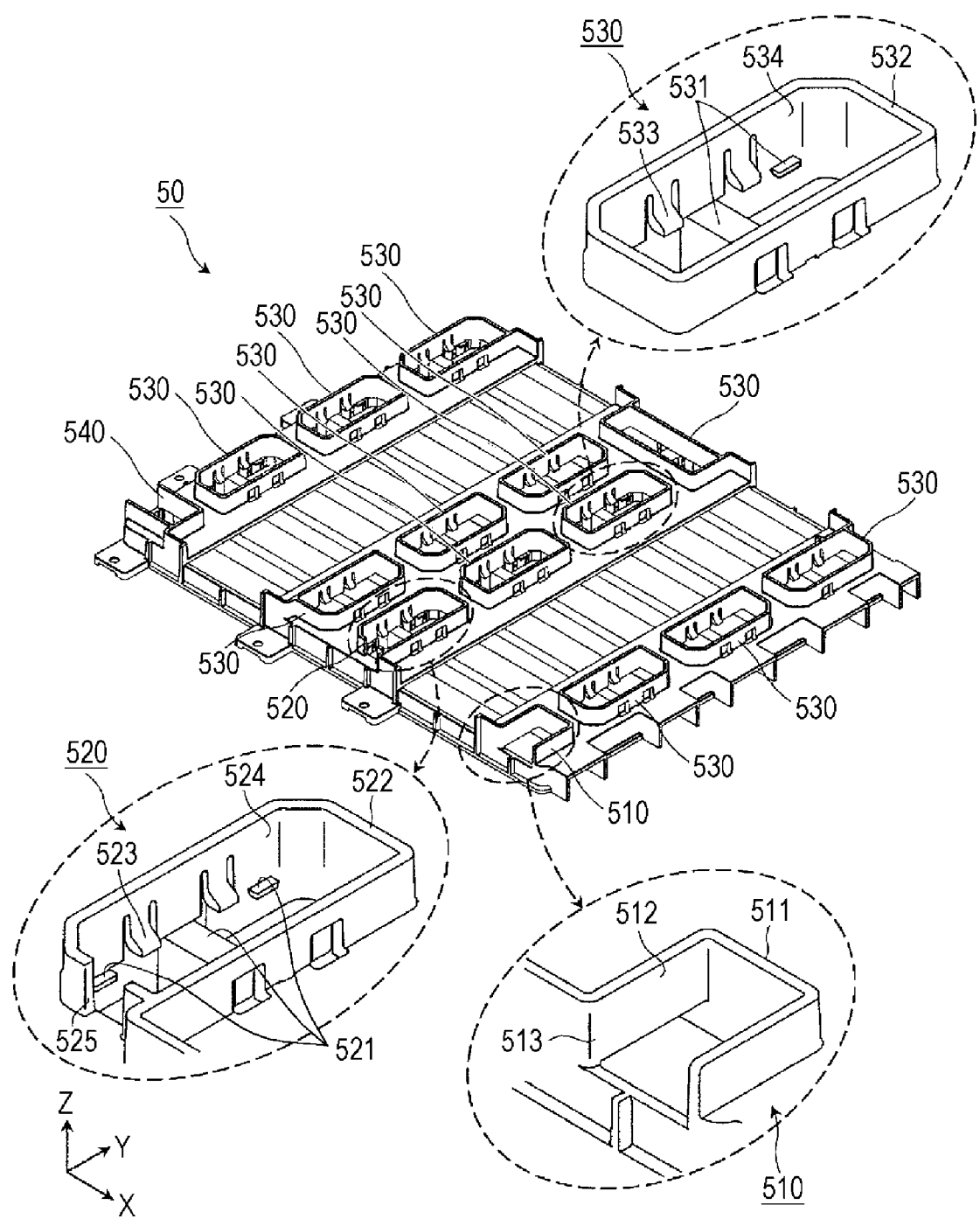
FIG. 10 is a perspective view showing the configuration of a terminal neighboring member according to a second embodiment of the present invention.
Figure 11:
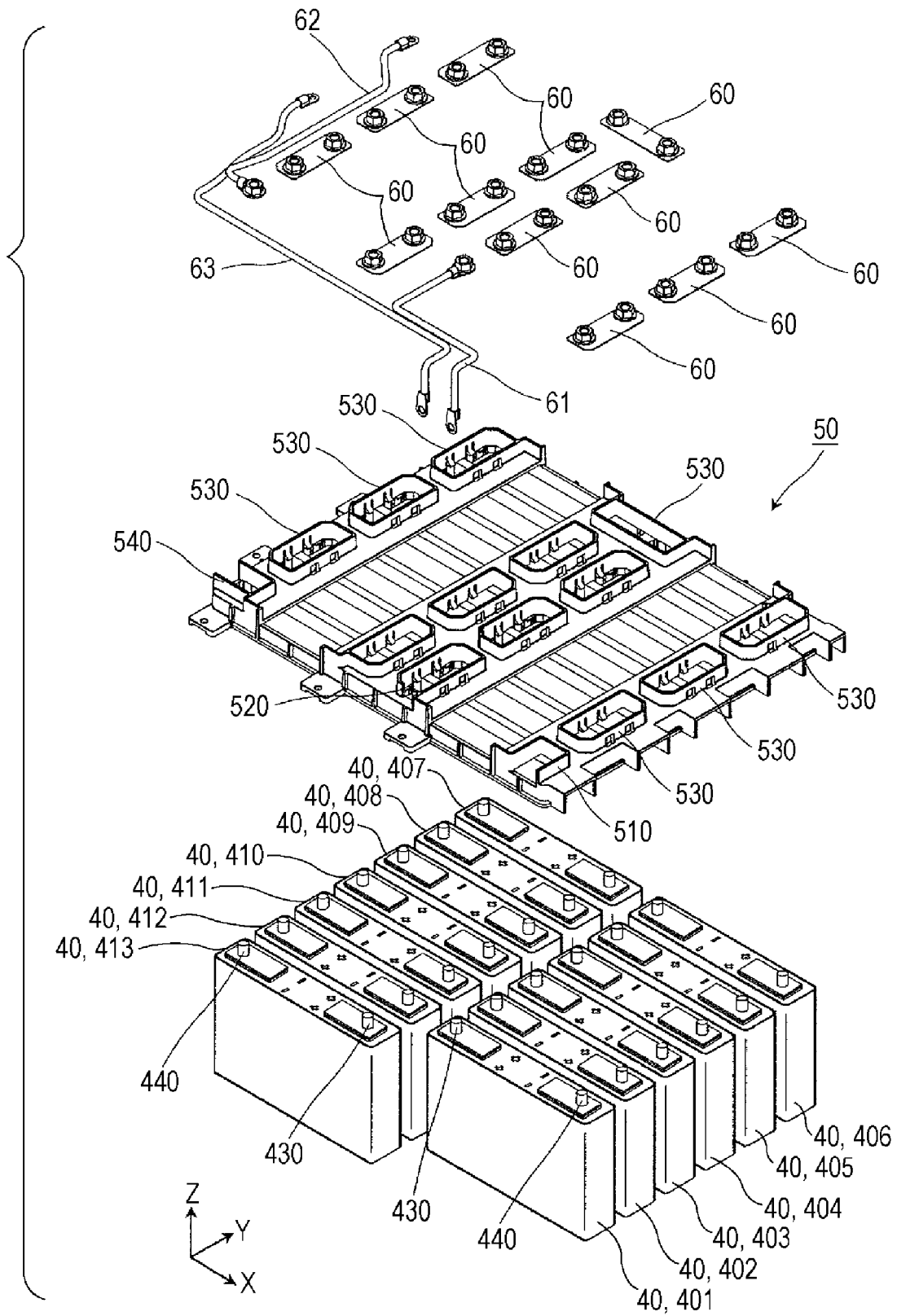
FIG. 11 is a perspective view showing the positional relationship between the terminal neighboring member, energy storage devices and bus bars.

FIG. 10 is a perspective view showing the configuration of the terminal neighboring member 50. FIG. 11 is a perspective view showing the positional relationship between the terminal neighboring member 50, energy storage devices 40 and bus bars 60.

As shown in these drawings, the terminal neighboring member 50 is a member which is disposed on a side where electrode terminals of the plurality of energy storage devices 40 (thirteen energy storage devices 401 to 413 in this embodiment) are disposed, and a plurality of bus bars 60 (twelve bus bars 60 in this embodiment) and conductive members 61 to 63 are disposed above the terminal neighboring member 50. The terminal neighboring member 50 includes a conductor disposing portion 510, a conductor disposing portion 520, twelve conductor disposing portions 530, and a conductor disposing portion 540.

First, the conductor disposing portions 530 are described.

The conductor disposing portion 530 is a portion where the bus bar 60 which connects electrode terminals of two energy storage devices 40 to each other is disposed. Twelve respective bus bars 60 are disposed in twelve respective conductor disposing portions 530 in a corresponding manner. The bus bar 60 is a conductive member which connects a positive electrode terminal 430 and a negative electrode terminal 440 of the neighboring energy storage devices 40 in a plurality of energy storage devices 40. The conductor disposing portion 530 includes a placing portion 531, a wall portion 532 and projecting portions 533. A conductor housing portion 534 which is an opening portion is formed by the wall portion 532.

The placing portion 531 is a flat-plate-like portion on which the bus bar 60 is placed. The projecting portions 533 are portions which project inward in the conductor housing portion 534 from an inner surface of the wall portion 532. The projecting portions 533 are disposed above the bus bar 60. The projecting portions 533 fix the bus bar 60 in the inside of the conductor housing portion 534 by sandwiching the bus bar 60 cooperatively with the placing portion 531.

The wall portion 532 is an annular wall which surrounds an outer periphery of the bus bar 60 when the bus bar 60 is placed on the placing portion 531. The wall portion 532 is disposed in a raised manner toward an upper side (Z axis direction). The wall portion 532 is formed along an outer peripheral shape of the bus bar 60. With such a configuration, the wall portion 532 prevents the bus bar 60 from coming into contact with other conductive members, and plays a role of a guide used for disposing the bus bar 60.

The wall portion 532 has a rectangular shape or a hexagonal shape obtained by chamfering two corner portions of a rectangular shape as viewed from above (Z axis direction). The bus bar 60 has the same rectangular or hexagonal outer peripheral shape as the wall portion 532. When the outer peripheral shapes of the wall portion 532 and the bus bar 60 are not in rotational symmetry such as a hexagonal shape, the wall portion 532 is formed along the outer periphery of the bus bar 60. Accordingly, it is also possible to prevent the bus bar 60 from being disposed in a wrong direction.

The conductor housing portion 534 is a space (opening portion) surrounded by the wall portion 532, and the bus bar 60 is housed in the conductor housing portion 534. In other words, the wall portion 532 is formed on the outer periphery of the conductor housing portion 534. The conductor housing portion 534 has the same outer peripheral shape as the bus bar 60 as viewed from above (Z axis direction).

The positive electrode terminal 430 and the negative electrode terminal 440 of the neighboring energy storage devices 40 are inserted into the conductor housing portion 534, and the bus bar 60 is connected to the positive electrode terminal 430 and the negative electrode terminal 440. That is, a bolt portion of the positive electrode terminal 430 is inserted into the conductor housing portion 534, and one end portion of the bus bar 60 is connected to the positive electrode terminal 430 by a nut. A bolt portion of the negative electrode terminal 440 is inserted into the conductor housing portion 534, and the other end portion of the bus bar 60 is connected to the negative electrode terminal 440 by a nut.

Next, the conductor disposing portion 520 is described.

The conductor disposing portion 520 is a portion where the conductive member 61 or a bus bar 60a described later (see FIG. 14 and FIG. 15) connected to the electrode terminal of the energy storage device 40 is disposed. In this embodiment, the conductive member 61 is disposed in the conductor disposing portion 520.

The conductive member 61 is a conductive member which is connected to a positive electrode terminal 430 of the energy storage device 401 disposed at an end portion on an X axis direction plus side and on a Y axis direction minus side in a plurality of energy storage devices 40, and a positive-electrode-side terminal of an outer connection terminal 210 mounted on a front wall portion 200 of an exterior unit 10. The conductive member 61 is a member which connects an electrode terminal of the energy storage device 40 and the outer connection terminal 210 to each other. Although the conductive member 61 is formed of a lead wire (metal wire) in this embodiment, the conductive member 61 may be in any form such as a metal rod member or a metal plate-like member.

In this embodiment, the conductor disposing portion 520 includes a placing portion 521, a wall portion 522 and projecting portions 523, and a conductor housing portion 524 is formed by the wall portion 522. A first lead-out portion 525 is formed in the wall portion 522.

The conductor disposing portion 520 differs from the conductor disposing portion 530 with respect to a point that the first lead-out portion 525 is formed in the wall portion 522. However, the configurations of the placing portion 521, the wall portion 522, the projecting portions 523 and the conductor housing portion 524 of the conductor disposing portion 520 are substantially equal to the configurations of the placing portion 531, the wall portion 532, the projecting portions 533 and the conductor housing portion 534 of the conductor disposing portion 530. Hereinafter, the detail of the configurations of the placing portion 521, the wall portion 522, the projecting portions 523 and the conductor housing portion 524 is described in a simplified manner.

The placing portion 521 is a flat-plate-like portion on which the bus bar 60a can be placed. The projecting portions 523 are portions which project inward in the conductor housing portion 524 from an inner surface of the wall portion 522. The projecting portions 523 are formed such that the projecting portions can be disposed above the bus bar 60a when the bus bar 60a is placed on the placing portion 521. That is, the projecting portions 523 can fix the bus bar 60a in the conductor housing portion 524 by sandwiching the bus bar 60a cooperatively with the placing portion 521. In this embodiment, the bus bar 60a is not disposed.

The wall portion 522 is an annular wall which surrounds an outer periphery of the bus bar 60a when the bus bar 60a is placed on the placing portion 521. The wall portion 522 is disposed in a raised manner toward an upper side (Z axis direction). The conductor housing portion 524 is a space (opening portion) surrounded by the wall portion 522 which can house the bus bar 60a therein. That is, the wall portion 522 is formed on an outer periphery of the conductor housing portion 524, and the bus bar 60a can be disposed in the conductor housing portion 524.

As described above, in this embodiment, the bus bar 60a is not disposed. However, when the bus bar 60a is disposed in the conductor housing portion 524, the bus bar 60a connects the positive electrode terminal 430 of the energy storage device 401 and the negative electrode terminal 440 of the energy storage device 414 described later to each other (see FIG. 14 and FIG. 15).

The first lead-out portion 525 is a rectangular opening formed so as to allow the leading out of the conductive member 61 from the conductor housing portion 524. To be more specific, the first lead-out portion 525 is formed by cutting away a portion of the wall portion 522 on a Y-axis direction minus side in a rectangular shape, and the conductive member 61 can be disposed in the first lead-out portion 525.

The conductor housing portion 524 and the first lead-out portion 525 are formed of opening portions which penetrate the different portions of the terminal neighboring member 50 in the different directions. That is, the conductor housing portion 524 is a bus bar disposing opening portion capable of housing the bus bar 60a which connects the positive electrode terminal 430 of the energy storage device 401 and the negative electrode terminal 440 of the energy storage device 414 to each other, and is formed in the conductor disposing portion 520 in a penetrating manner in a Z axis direction. The first lead-out portion 525 is a terminal connecting opening portion capable of leading out the conductive member 61 toward a positive-electrode-side terminal of the outer connection terminal 210 from the positive electrode terminal 430 of the energy storage device 401, and is formed in the wall portion 522 of the conductor disposing portion 520 in a penetrating manner in a Y axis direction. With such a configuration, the bus bar disposing opening portion and the terminal connecting opening portion form opening portions which penetrate the different portions of the terminal neighboring member 50 in different directions.

The first lead-out portion 525 may be formed such that the first lead-out portion 525 penetrates the wall portion 522 on a Y-axis direction plus side in a Y axis direction, or the first lead-out portion 525 may be formed such that the first lead-out portion 525 penetrates the wall portion 522 on a X-axis direction plus side or an X-axis direction minus side in an X axis direction. The first lead-out portion 525 is not limited to a rectangular cut-away portion, and may be a cut-away portion having any shape such as a semicircular shape, or may be a through hole having a rectangular shape, a circular shape or the like in place of a cut-away portion.

Next, the conductor disposing portion 510 is described.

The conductor disposing portion 510 is a portion where a conductive member 64 described later (see FIG. 14 and FIG. 15) which is connected to the electrode terminal of the energy storage device 40 can be disposed. When the conductive member 64 is disposed in the conductor disposing portion 510, the conductive member 64 is connected to the positive electrode terminal 430 of the energy storage device 414 disposed at an end portion (an end portion on an X-axis-direction plus side and a Y-axis-direction minus side) in a plurality of energy storage devices 40 (see FIG. 14 and FIG. 15). In this embodiment, the conductive member 64 is not disposed in the conductor disposing portion 510. However, the description is made hereinafter assuming that the conductive member 64 is disposed in the conductor disposing portion 510.

The conductive member 64 is a member having conductivity which is connected to the positive electrode terminal 430 of the energy storage device 414 disposed at an end portion on an X-axis-direction plus side and a Y-axis-direction minus side out of the plurality of energy storage devices 40 and to a positive-electrode-side terminal of an outer connection terminal 210 mounted on a front wall portion 200 of an exterior unit 10. The conductive member 64 is a member which connects an electrode terminal of the energy storage device 40 and the outer connection terminal 210 to each other. Although the conductive member 64 is formed of a lead wire (metal wire) in this embodiment, the conductive member 64 may be in any form such as a metal rod member or a metal plate-like member.

In this manner, the outer connection terminal 210 is configured to be connected to the positive electrode terminal 430 of the energy storage device 401 and to the positive electrode terminal 430 of the energy storage device 414. That is, the outer connection terminal 210 can be connected to the positive electrode terminal 430 of the energy storage device 401 through the conductive member 61, and the outer connection terminal 210 can be connected to the positive electrode terminal 430 of the energy storage device 414 through the conductive member 64.

In this embodiment, the conductor disposing portion 510 includes a wall portion 511, and a conductor housing portion 512 is formed by the wall portion 511. A second lead-out portion 513 is formed in the wall portion 511.

The wall portion 511 is an annular wall which surrounds an outer periphery of the conductive member 64 when the conductive member 64 is disposed. The wall portion 511 is disposed in a raised manner toward an upper side (Z axis direction). The wall portion 511 plays a role of preventing the conductive member 64 from coming into contact with other conductive members.

The conductor housing portion 512 is a space (opening portion) surrounded by the wall portion 511, and the conductive member 64 is housed in the conductor housing portion 512. In other words, the wall portion 511 is formed on the outer periphery of the conductor housing portion 512. The positive electrode terminal 430 of the energy storage device 40 is inserted into the conductor housing portion 512, and the conductive member 61 is connected to the positive electrode terminal 430. That is, a bolt portion of the positive electrode terminal 430 is inserted into the conductor housing portion 512, and one end portion of the conductive member 61 is connected to the positive electrode terminal 430 by a nut.

The second lead-out portion 513 is a rectangular opening formed so as to allow the leading out of the conductive member 64 from the conductor housing portion 512. To be more specific, the second lead-out portion 513 is formed by cutting away a portion of the wall portion 511 on a Y-axis direction minus side in a rectangular shape, and the conductive member 64 can be disposed in the second lead-out portion 513.

The conductor housing portion 512 and the second lead-out portion 513 are formed of opening portions which penetrate the different portions of the terminal neighboring member 50 in the different directions. That is, the conductor housing portion 512 is an opening portion formed such that the conductor housing portion 512 penetrates the conductor disposing portion 510 in a Z axis direction, and the second lead-out portion 513 is an opening portion formed such that the second lead-out portion 513 penetrates the wall portion 511 of the conductor disposing portion 510 in a Y axis direction.

The second lead-out portion 513 may be formed such that the second lead-out portion 513 penetrates the wall portion 511 on a Y-axis direction plus side in a Y axis direction, or the second lead-out portion 513 may be formed such that the second lead-out portion 513 penetrates the wall portion 511 on an X-axis direction plus side or an X-axis direction minus side in an X axis direction. The second lead-out portion 513 is not limited to a rectangular cut-away portion, and may be a cut-away portion having any shape such as a semicircular shape, or may be a through hole having a rectangular shape, a circular shape or the like in place of a cut-away portion.

Next, the conductor disposing portion 540 is described. The configuration of the conductor disposing portion 540 is substantially equal to the configuration of the above-mentioned conductor disposing portion 510. Accordingly, the configuration of the conductor disposing portion 540 is described in a simplified manner hereinafter.

The conductor disposing portion 540 is a portion where a conductive member 62 which is connected to the electrode terminal of the energy storage device 40 is disposed. The conductive member 62 is a member having conductivity which is connected to the negative electrode terminal 440 of the energy storage device 413 disposed at an end portion (an end portion on an X-axis-direction minus side and a Y-axis-direction minus side) in the plurality of energy storage devices 40. Although the conductive member 62 is formed of a lead wire (metal wire) in this embodiment, the conductive member 62 may be in any form such as a metal rod member or a metal plate-like member.

The conductor disposing portion 540 has a rectangular opening portion where one end portion of the conductive member 62 is disposed (that is, an opening portion which corresponds to the conductor housing portion 512 and the second lead-out portion 513 of the conductor disposing portion 510). A bolt portion of the negative electrode terminal 440 of the energy storage device 413 is inserted into the opening portion, and one end portion of the conductive member 62 is connected to the negative electrode terminal 440 by a nut. A wall (that is, a wall which corresponds to the wall portion 511 of the conductor disposing portion 510) raised upward (Z axis direction) is formed around the opening portion so as to prevent the conductive member 62 from coming into contact with other conductive members. The other end portion of the conductive member 62 is connected to a negative-electrode-side terminal of an outer connection terminal 210 mounted on a front wall portion 200 of an exterior unit 10 by way of the main printed circuit board 82 and the conductive member 63.

Next, the specific description is made with respect to the configuration where the plurality of energy storage devices 40 (energy storage devices 401 to 413) are connected to each other using the bus bars 60 and the conductive members 61 to 63.

Figure 12:
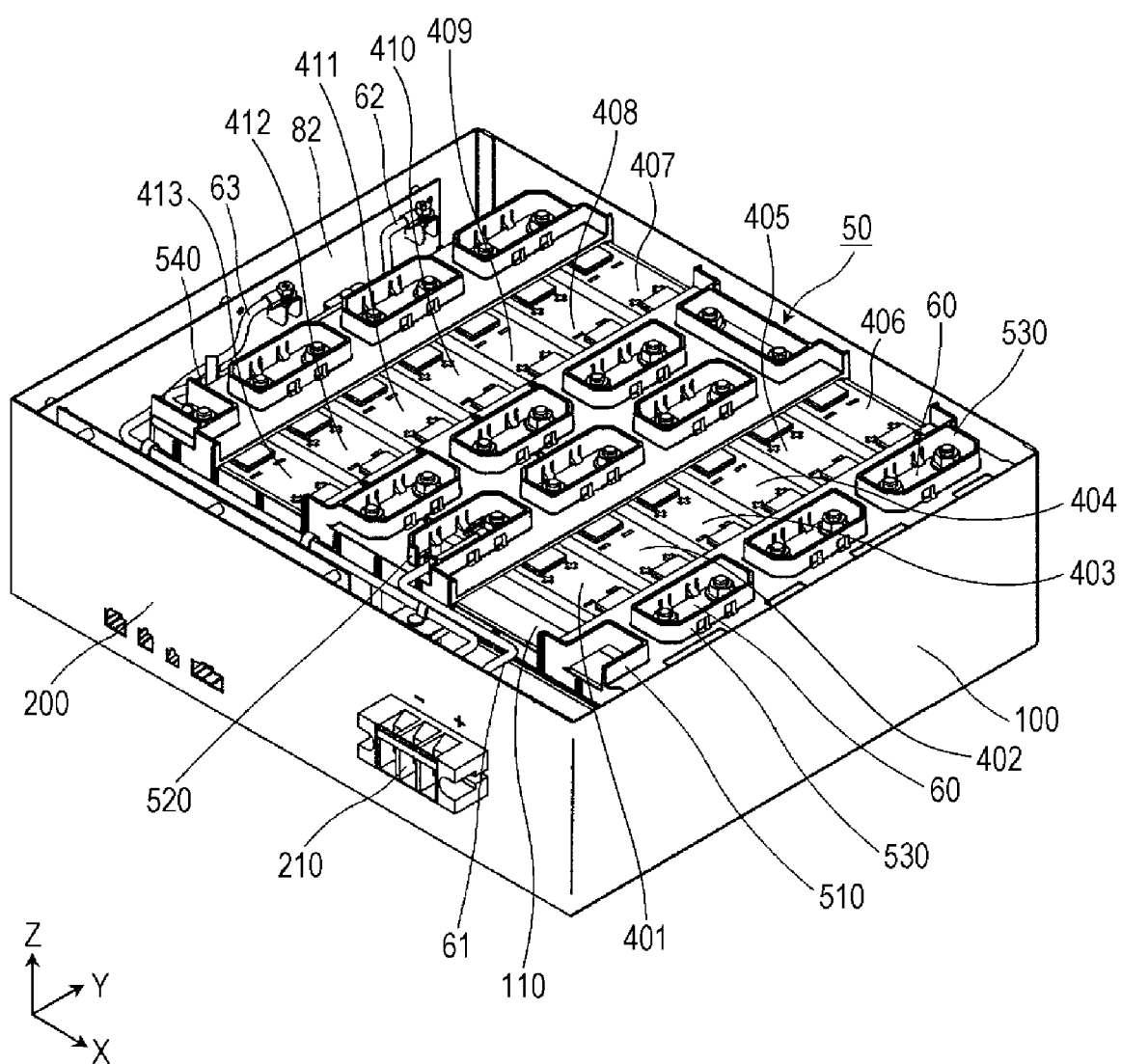
FIG. 12 is a perspective view showing the configuration where a plurality of energy storage devices are connected to each other by the bus bars and conductive members.

FIG. 12 is a perspective view showing the configuration where the plurality of energy storage devices 40 are connected to each other by the bus bars 60 and the conductive members 61 to 63. FIG. 12 is a perspective view showing the configuration where the upper wall portion 300 and the printed circuit board 70 are removed from the energy storage apparatus 1 shown in FIG. 1.

Figure 13:
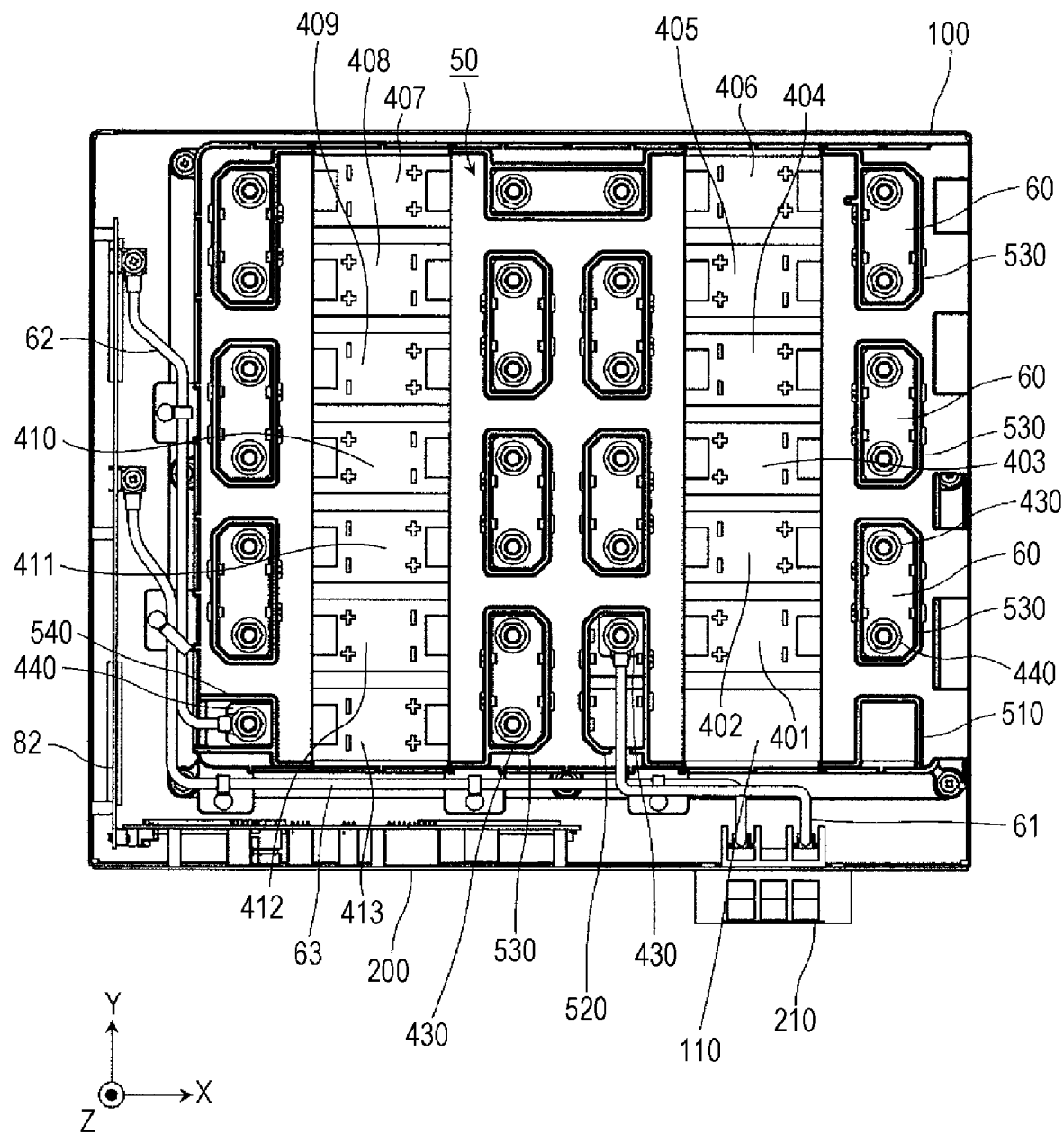
FIG. 13 is a plan view showing the configuration where the plurality of energy storage devices are connected to each other by the bus bars and the conductive members.

FIG. 13 is a plan view showing the configuration where the plurality of energy storage devices 40 are connected to each other by the bus bars 60 and the conductive members 61 to 63. FIG. 13 is an upper plan view showing the configuration shown in FIG. 12 as viewed from a Z axis direction plus side.

As shown in these drawings, the positive-electrode-side terminal of the outer connection terminal 210 mounted on the front wall portion 200 and the positive electrode terminal 430 of the energy storage device 401 are connected to each other by the conductive member 61 disposed in the conductor disposing portion 520. The conductive member 61 is disposed in a straddling manner over the energy storage device housing portion 110 in which the energy storage device 414 described later is housed. The conductive member 61 connects the outer connection terminal 210 and the energy storage device 401 which are disposed adjacently to the energy storage device housing portion 110 and sandwich the energy storage device housing portion 110 therebetween.

The energy storage device housing portion 110 is a housing portion for housing the energy storage device 40 which is disposed at a position adjacently to the energy storage device 401 and is disposed closest to the outer connection terminal 210. That is, the energy storage device housing portion 110 is a space at an end portion on an X-axis-direction plus side and a Y-axis-direction minus side in spaces in which the energy storage device 40 is housed respectively.

The negative electrode terminal 440 of the energy storage device 401 and the positive electrode terminal 430 of the energy storage device 402 are connected to each other by the bus bar 60 disposed in the conductor disposing portion 530. Such connection is established up to the positive electrode terminal 430 of the energy storage device 413 in the same manner. The negative electrode terminal 440 of the energy storage device 413 and the main printed circuit board 82 are connected to each other by the conductive member 62 disposed in the conductor disposing portion 540.

The main printed circuit board 82 and the negative-electrode-side terminal of the outer connection terminal 210 mounted on the front wall portion 200 are connected to each other by the conductive member 63. Although the conductive member 63 is formed of a lead wire (metal wire) in this embodiment, the conductive member 63 may be in any form such as a metal rod member or a metal plate-like member.

As described above, the energy storage apparatus 1 adopts the configuration where the energy storage apparatus 1 includes thirteen energy storage devices 40. The positive electrode terminal 430 of the energy storage device 401 and the positive-electrode-side terminal of the outer connection terminal 210 are connected to each other without being connected to the negative electrode terminal 440 and the positive electrode terminal 430 of the energy storage device 414 described later. The configuration of the energy storage apparatus 1 can be changed to the configuration where the energy storage apparatus 1 includes fourteen energy storage devices 40 from the configuration where the energy storage apparatus 1 includes thirteen energy storage devices 40. Hereinafter, the configuration of the energy storage apparatus 1 is described where the energy storage apparatus 1 includes fourteen energy storage devices 40.

Figure 14:
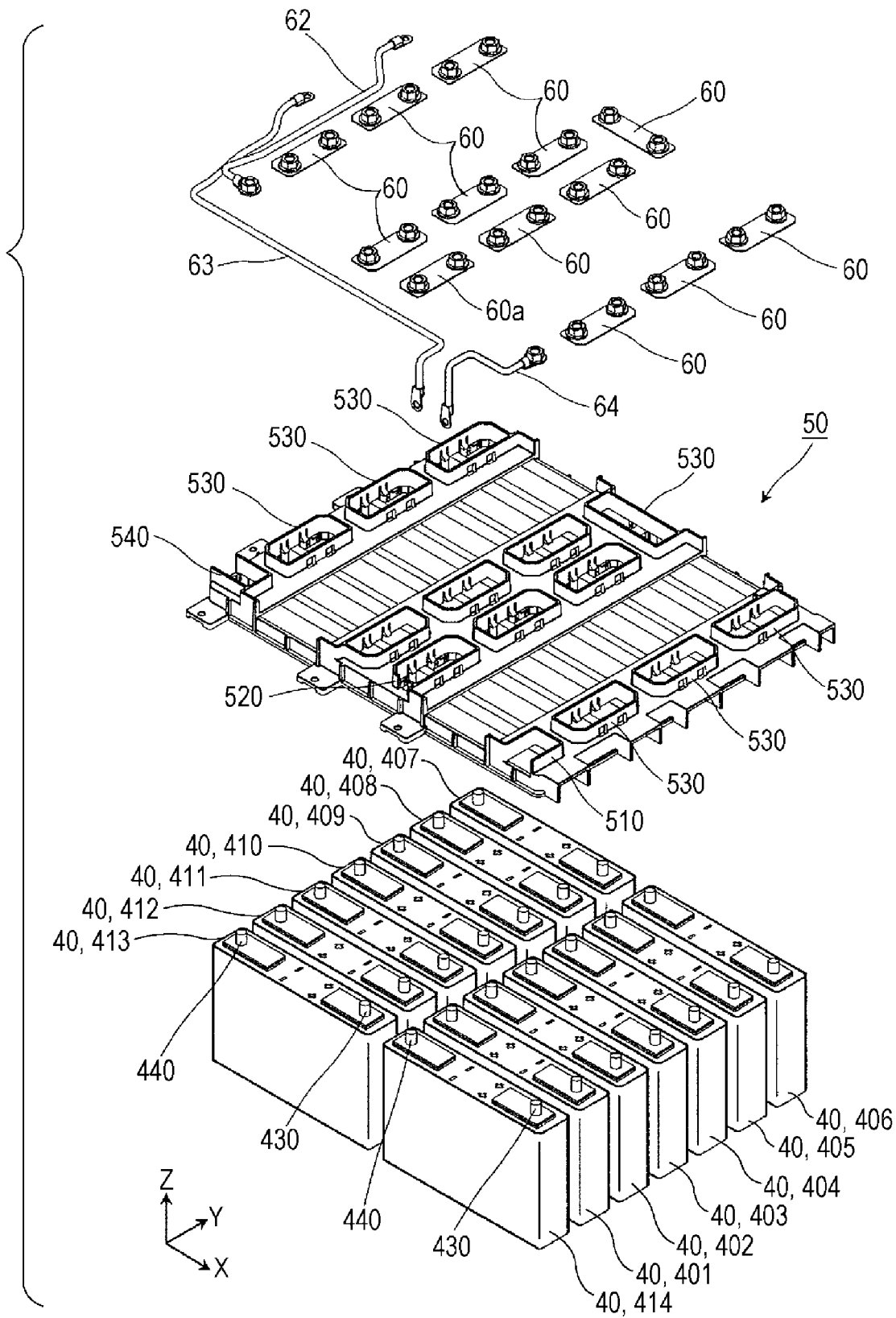
FIG. 14 is a perspective view showing the configuration of the energy storage apparatus when the energy storage apparatus includes fourteen energy storage devices.
Figure 15:
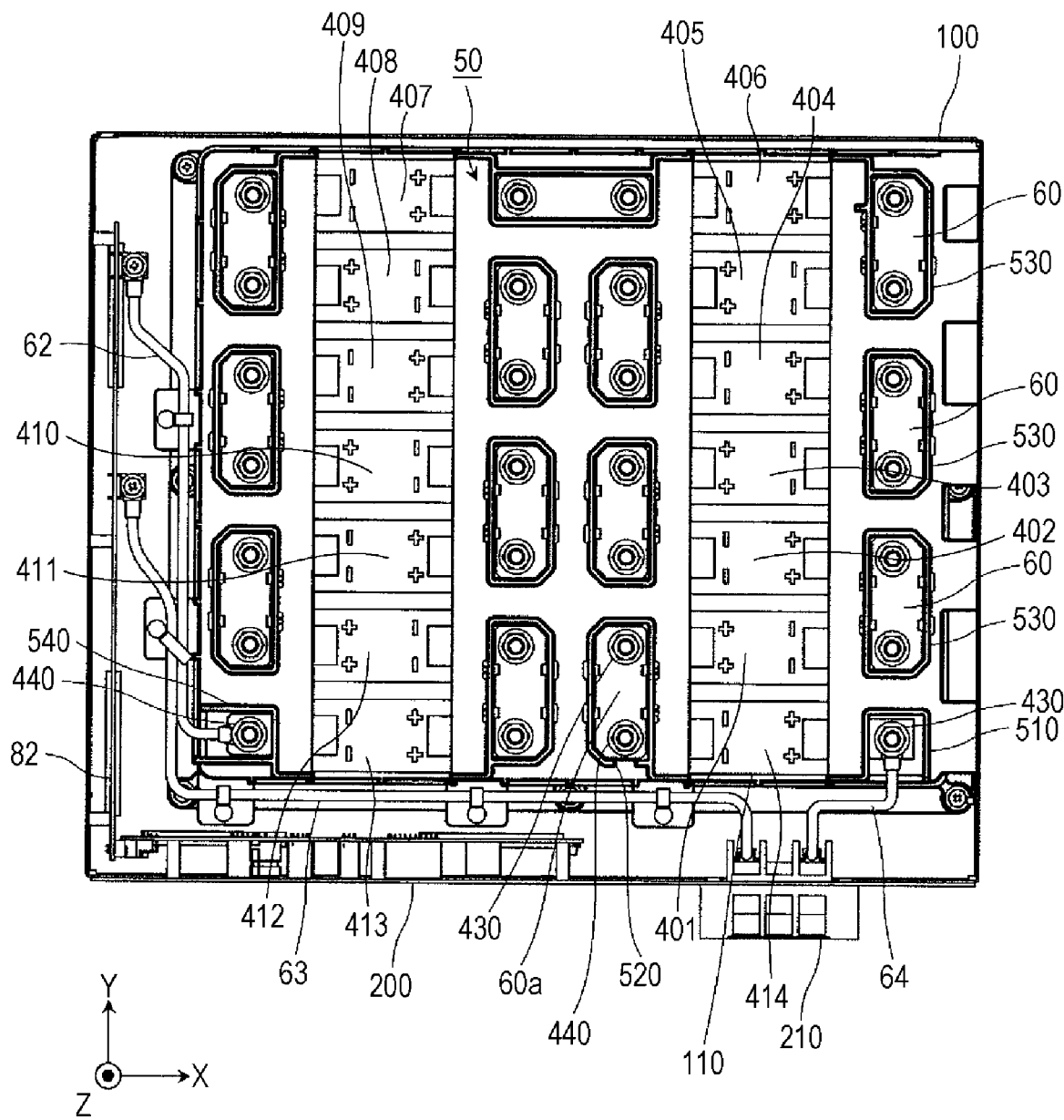
FIG. 15 is a plan view showing the configuration of the energy storage apparatus when the energy storage apparatus includes fourteen energy storage devices.

FIG. 14 is a perspective view showing the configuration of the energy storage apparatus 1 when the energy storage apparatus 1 includes fourteen energy storage devices 40. FIG. 14 is a view which corresponds to FIG. 11. FIG. 15 is a plan view showing the configuration of the energy storage apparatus 1 when the energy storage apparatus 1 includes fourteen energy storage devices 40. FIG. 15 is a view which corresponds to FIG. 13.

As shown in these drawings, the energy storage apparatus 1 includes conductive members 64 and the bus bars 60a in place of the conductive members 61. An energy storage device 414 is added to the energy storage apparatus 1 so that the energy storage apparatus 1 includes fourteen energy storage devices 40 (energy storage devices 401 to 414).

The energy storage device 414 is an energy storage device disposed at a position adjacently to the energy storage device 401 and closest to the outer connection terminal 210 (an end portion on an X-axis-direction plus side and a Y-axis-direction minus side). The energy storage device 414 is disposed in the inside of the energy storage apparatus 1 by being housed in the energy storage device housing portion 110.

The energy storage device 414 includes the positive electrode terminal 430 which can be connected to the positive-electrode-side terminal of the outer connection terminal 210 and the negative electrode terminal 440 which can be connected to the positive electrode terminal 430 of the energy storage device 401. The energy storage device 414 is connected to the positive-electrode-side terminal of the outer connection terminal 210 and the positive electrode terminal 430 of the energy storage device 401 in a state where the energy storage device 414 is housed in the energy storage device housing portion 110.

The conductive member 64 connects a positive-electrode-side terminal of an outer connection terminal 210 and the positive electrode terminal 430 of the energy storage device 414 to each other. To be more specific, a bolt portion of the positive electrode terminal 430 of the energy storage device 414 is inserted into the conductor housing portion 512 of the conductor disposing portion 510, and one end portion of the conductive member 64 is connected to the positive electrode terminal 430 by a nut. The conductive member 64 is led out from the second lead-out portion 513, and the other end portion of the conductive member 64 is connected to the positive-electrode-side terminal of the outer connection terminal 210.

The bus bar 60a connects the negative electrode terminal 440 of the energy storage device 414 and a positive electrode terminal 430 of the energy storage device 401 to each other. The bus bar 60a is disposed in the conductor disposing portion 520. To be more specific, the bus bar 60a is housed in the conductor housing portion 524 of the conductor disposing portion 520. A bolt portion of the negative electrode terminal 440 of the energy storage device 414 is inserted into the conductor housing portion 524, and one end portion of the bus bar 60a is connected to the negative electrode terminal 440 by a nut. A bolt portion of the positive electrode terminal 430 of the energy storage device 401 is inserted into the conductor housing portion 524, and the other end portion of the bus bar 60a is connected to the positive electrode terminal 430 by a nut. The bus bar 60a has substantially the same configuration as the bus bar 60 and hence, the detailed description of the bus bar 60a is omitted.

The positive-electrode-side terminal of the outer connection terminal 210 and the positive electrode terminal 430 of the energy storage device 414 are connected to each other by the conductive member 64 in this manner. The negative electrode terminal 440 of the energy storage device 414 and the positive electrode terminal 430 of the energy storage device 401 are connected to each other by the bus bar 60a.

According to the above-mentioned configuration, the energy storage apparatus 1 includes therein the energy storage device housing portion 110 in which the energy storage device 414 (second energy storage device) having the negative electrode terminal 440 (second terminal) contactable to the positive electrode terminal 430 of the energy storage device 401 (the first terminal of the first energy storage device) is housed. Further, the outer connection terminal 210 is configured to be connected with the positive electrode terminal 430 of the energy storage device 401 (the first terminal of the first energy storage device) and the positive electrode terminal 430 of the energy storage device 414 (the third terminal having polarity which is different from polarity of the second terminal which the second energy storage device has (reverse polarity)).

The energy storage apparatus 1 includes the conductor housing portion 524 capable of housing the bus bar 60a (first conductive member) which connects the positive electrode terminal 430 of the energy storage device 401 (the first terminal of the first energy storage device) and the negative electrode terminal 440 of the energy storage device 414 (the second terminal which the second energy storage device different from the first energy storage device has) to each other. Further, the energy storage apparatus 1 includes the first lead-out portion 525 capable of leading out the conductive member 61 (second conductive member) which connects the positive electrode terminal 430 (first terminal) of the energy storage device 401 and the positive-electrode-side terminal of the outer connection terminal 210 to each other from the conductor housing portion 524.

When the energy storage apparatus 1 includes thirteen energy storage devices 40, the conductive member 61 (second conductive member) connects the positive electrode terminal 430 of the energy storage device 401 (the first terminal of the first energy storage device) and the positive-electrode-side terminal of the outer connection terminal 210 to each other. The positive electrode terminal 430 of the energy storage device 401 (the first terminal of the first energy storage device) and the positive-electrode-side terminal of the outer connection terminal 210 are connected to each other without being connected to the negative electrode terminal 440 and the positive electrode terminal 430 of the energy storage device 414 (the second terminal and the third terminal of the second energy storage device).

When the energy storage apparatus 1 includes fourteen energy storage devices 40, the conductive member 64 (third conductive member) connects the positive-electrode-side terminal of the outer connection terminal 210 and the positive electrode terminal 430 of the energy storage device 414 (the third terminal of the second energy storage device) to each other. Further, the bus bar 60a (first conductive member) connects the positive electrode terminal 430 of the energy storage device 401 (the first terminal of the first energy storage device) and the negative electrode terminal 440 of the energy storage device 414 (the second terminal of the second energy storage device) to each other.

As has been described above, the energy storage apparatus 1 of this embodiment of the present invention includes: the energy storage device housing portion 110 in which the second energy storage device having the second terminal which can be connected to the first terminal of the first energy storage device is housed; and the outer connection terminal 210 which can be connected to the first terminal and the third terminal of the second energy storage device. When the second energy storage device is housed in the energy storage device housing portion 110, the first terminal of the first energy storage device and the second terminal of the second energy storage device are connected to each other, and the third terminal of the second energy storage device and the outer connection terminal 210 are connected to each other. When the second energy storage device is not housed in the energy storage device housing portion 110, the first terminal of the first energy storage device and the outer connection terminal 210 are connected to each other. With such a configuration, the second energy storage device can be easily mounted and easily removed. According to the energy storage apparatus 1, the number of energy storage devices 40 can be easily changed. The terminal neighboring member 50, the exterior unit 10 or the like can be used in common even when the number of energy storage devices 40 is changed and hence, the energy storage apparatuses 1 which differ in the number of energy storage devices 40 can be formed at a low cost.

When the configuration of the energy storage apparatus 1 is changed from the configuration where the energy storage apparatus 1 includes fourteen energy storage devices 40 to the configuration where the energy storage apparatus 1 includes thirteen energy storage devices 40, the energy storage device 414 which is connected to the outer connection terminal 210 is removed. When the energy storage device 40 to be removed is the energy storage device between two energy storage devices among the energy storage devices 401 to 412, in general, from a viewpoint of cost or the like, after the energy storage device 40 to be removed is removed, the electrical connection between the electrode terminals of the energy storage devices is established by a wire and a bus bar is not used. In this case, at the time of measuring a voltage between the electrode terminals of the energy storage devices 40, since an electric resistance of the wire is larger than an electric resistance of the bus bar, a voltage drop when electricity is supplied to the energy storage device 40 becomes large in the case where the electrode terminals are connected to each other by the wire compared to the case where the electrode terminals are connected to each other by the bus bar thus generating an error in the measurement of voltage. The energy storage apparatus 1 of this embodiment adopts the above-mentioned configuration and hence, even when the number of energy storage devices 40 is changed, the connection between two energy storage devices 40 by the bus bar can be maintained whereby lowering of accuracy in measurement of voltage can be suppressed.

In the energy storage apparatus 1, the terminal neighboring member 50 includes: the conductor housing portion 524 capable of housing the first conductive member which connects the first terminal of the first energy storage device and the second terminal of the second energy storage device to each other; and the first lead-out portion 525 capable of leading out the second conductive member which connects the first terminal and the outer connection terminal 210 from the conductor housing portion 524. The second energy storage device can be connected to the first energy storage device by arranging the first conductive member in the conductor housing portion 524, and the outer connection terminal 210 can be connected to the first energy storage device by arranging the second conductive member in the first lead-out portion 525. Accordingly, by removing the second energy storage device from a state where the second energy storage device is connected to the first energy storage device and the outer connection terminal 210 is connected to the second energy storage device and by connecting the outer connection terminal 210 to the first energy storage device, the number of energy storage devices 40 can be reduced. According to the energy storage apparatus 1, the energy storage device 40 can be easily mounted and easily removed and hence, the number of energy storage devices 40 can be easily changed.

The conductor housing portion 524 formed in the terminal neighboring member 50 is a bus bar arranging opening portion, and the first lead-out portion 525 is a terminal connecting opening portion. These two opening portions penetrate different portions of the terminal neighboring member 50 in different directions. By opening the conductor housing portion 524 in the direction toward the second energy storage device, the first energy storage device and the second energy storage device can be easily connected to each other through the conductor housing portion 524. By opening the first lead-out portion 525 in the direction toward the outer connection terminal 210, the first energy storage device and the outer connection terminal 210 can be easily connected to each other through the first lead-out portion 525.

In the terminal neighboring member 50, the wall portion 522 is formed on an outer periphery of the conductor housing portion 524, and the first lead-out portion 525 is formed on the wall portion 522. Accordingly, even when the wall portion 522 is formed on the outer periphery of the conductor housing portion 524, the first lead-out portion 525 can be easily formed.

The terminal neighboring member 50 further includes the second lead-out portion 513 capable of leading out the third conductive member which connects the outer connection terminal 210 and the third terminal of the second energy storage device to each other. Accordingly, the second energy storage device can be easily connected to the outer connection terminal 210 at the time of mounting the second energy storage device.

The energy storage device housing portion 110 is disposed at a position disposed adjacently to the first energy storage device and closest to the outer connection terminal 210. Accordingly, at the time of housing the second energy storage device in the energy storage device housing portion 110, the second energy storage device can be easily connected to the first energy storage device and the outer connection terminal 210.

The first terminal of the first energy storage device and the outer connection terminal 210 are connected to each other without being connected to the second terminal of the second energy storage device and the third terminal respectively. That is, even when the energy storage apparatus 1 is provided with the energy storage device housing portion 110 into which the second energy storage device is housed, the first energy storage device and the outer connection terminal 210 are connected to each other with the second energy storage device not housed in the energy storage device housing portion 110. Accordingly, in the energy storage apparatus 1, the number of energy storage devices 40 can be reduced from the number of energy storage devices which can be housed in the energy storage device housing portion 110.

Although the energy storage apparatus 1 according to the embodiment of the present invention has been described heretofore, the present invention is not limited to the above-mentioned embodiment. It should be construed that the embodiment disclosed this time is only for exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention. Further, configurations formed by combining constitutional elements included in the above-mentioned embodiment as desired also fall within the scope of the present invention.

For example, in the above-mentioned embodiments, the first lead-out portion 525 is formed on the conductor disposing portion 520, and the second lead-out portion 513 is formed on the conductor disposing portion 510. However, provided that the energy storage apparatus 1 is configured such that either one of the conductive member 61 or the conductive member 64 can be led out, either one of the first lead-out portion 525 or the second lead-out portion 513 may not be provided, or neither the first lead-out portion 525 nor the second lead-out portion 513 may be provided.

In the above-mentioned embodiments, the conductor housing portion 524 and the first lead-out portion 525 are formed of opening portions which penetrate the different portions of the terminal neighboring member 50 in the different directions. The conductor housing portion 512 and the second lead-out portion 513 are also formed of opening portions which penetrate the different portions of the terminal neighboring member 50 in the different directions. However, the conductor housing portion 524 and the first lead-out portion 525 may be formed of opening portions which penetrate the different portions of the terminal neighboring member 50 in the same direction. Alternatively, the conductor housing portion 512 and the second lead-out portion 513 may be formed of opening portions which penetrate the different portions of the terminal neighboring member 50 in the same direction.

In the above-mentioned embodiments, the first lead-out portion 525 is formed in the wall portion 522 of the conductor disposing portion 520, and the second lead-out portion 513 is formed in the wall portion 511 of the conductor disposing portion 510. However, the first lead-out portion 525 may be formed in a portion other than the wall portion 522, and the second lead-out portion 513 may be formed in a portion other than the wall portion 511.

In the above-mentioned embodiments, the energy storage apparatus 1 is configured such that the energy storage device 414 can be mounted and removed. However, the energy storage device which can be mounted and removed is not limited to the energy storage device 414, and the energy storage device 413 may be selected as such an energy storage device. The energy storage device housing portion in which the energy storage device which can be mounted and removed is housed is not limited to the housing portion disposed closest to the outer connection terminal 210. In this case, the lead-out portion which leads out the conductive member is formed on the conductor disposing portion which corresponds to the energy storage device 413.

In the above-mentioned embodiments, the energy storage apparatus 1 has the configuration where the number of energy storage devices 40 which the energy storage apparatus 1 includes can be changed to 13 pieces from 14 pieces by decreasing 1 piece. However, the number of energy storage devices 40 which the energy storage apparatus 1 can change is not particularly limited. For example, the energy storage apparatus 1 may have the configuration where the number of energy storage devices 40 can be changed to 12 pieces from 14 pieces by decreasing 2 pieces, or the configuration where the number of energy storage devices 40 can be changed to other numbers. For example, when the number of energy storage devices 40 is decreased by 2 pieces, as the energy storage devices 40 to be removed, the combination of the energy storage devices 414 and 401, the combination of the energy storage devices 414 and 413 or the like is considered. In these cases, the change in the number of energy storage devices 40 can be realized by forming the lead-out portion which leads out the conductive member on the conductor disposing portion which corresponds to the energy storage devices to be removed.

In the above-mentioned embodiments, the energy storage apparatus 1 is configured such that the energy storage apparatus 1 can house 14 pieces of energy storage devices 40. However, the number of energy storage devices 40 which the energy storage apparatus 1 can house is not limited to 14 pieces, and the energy storage apparatus 1 can house any desired number of energy storage devices 40. In the above-mentioned embodiments, the energy storage devices 40 are arranged in two rows (two rows consisting of the row formed of the energy storage devices 401 to 406 (and 414) and the row formed of the energy storage devices 407 to 413). However, the energy storage apparatus 1 may include one row or three or more rows of energy storage devices.

In the above-mentioned embodiments, the energy storage devices 40 (energy storage devices 401 to 413 (and 414)) are disposed such that the longitudinal direction of the container lid portion 421 is directed in the X-axis direction (a long-side surface of the container 410 being disposed parallel to an X-Z plane) in FIG. 7 (or FIG. 9), for example. However, the energy storage devices 40 may be disposed such that the longitudinal direction of the container lid portion 421 is directed in the Y axis direction (the long-side surface of the container 410 being disposed parallel to a Y-Z plane). Also in this case, among the spaces into which the energy storage device 40 is housed, the space at an end portion on an X-axis-direction plus side and a Y-axis-direction minus side is set as the energy storage device housing portion 110 so that the configuration which is substantially equal to the configurations of the above-mentioned embodiments can be realized. In this case, in the same manner as the above-mentioned embodiments, it is possible to adopt the configuration where the energy storage device housed in the energy storage device housing portion 110 is set as the energy storage device 414, the energy storage device 401 is disposed adjacently to the energy storage device 414, and the outer connection terminal 210 can be connected to the energy storage device 414 and the energy storage device 401. In this case, the energy storage device housing portion 110 becomes the housing portion for housing the energy storage device disposed adjacently to the energy storage device 401 and closest to the outer connection terminal 210. In addition, in this case, the number, the arrangement positions, a connection mode (series connection or parallel connection) and the like of the energy storage devices 40 are not particularly limited. The energy storage devices 40 may be disposed such that the longitudinal direction of the container lid portion 421 is directed in a direction different from an X-axis direction and a Y-axis direction (the direction inclined with respect to the X-axis direction and the Y-axis direction). The energy storage device housing portion 110 may not be configured to be disposed closest to the outer connection terminal 210.

The present invention can be realized not only in the form of the energy storage apparatus 1 but also in the form of the terminal neighboring member 50 disposed on an electrode terminal side of the energy storage device 40 which the energy storage apparatus 1 includes.

The present invention is applicable to energy storage apparatuses or the like where the number of energy storage devices can be easily changed.

What is claimed is:

1. An energy storage apparatus, comprising:
  a first energy storage device including a first terminal comprising either a positive electrode terminal or a negative electrode terminal and a lid on which the first terminal is disposed and a bottom surface opposing the lid in a first direction, the first terminal protruding from the lid the first direction; and
  a terminal neighboring member that is disposed adjacently to the first terminal of the first energy storage device,
  wherein the terminal neighboring member includes:
    a first housing portion configured to house a first conductive member that connects the terminal and a second terminal for a second energy storage device to each other; and
    a first lead-out portion configured to lead out, from the first housing portion, a second conductive member that connects the first terminal and a third terminal for a third energy storage device to each other,
  wherein, when viewed from the first direction, in a second direction perpendicular to the first direction, and in a third direction perpendicular to the first direction and the second direction, the first energy storage device is located not adjacent to the third energy storage device,
  wherein the second conductive member includes:
    a first end that terminates an extension of the second conductive member at the first terminal; and
    a second end that terminates the extension of the second conductive member at the third terminal, and
  wherein, in the first direction, the third terminal of the third energy storage device is disposed adjacently to the terminal neighboring member.

2. The energy storage apparatus according to claim 1, wherein the first lead-out portion includes an opening in the terminal neighboring member.

3. The energy storage apparatus according to claim 1, wherein the terminal neighboring member includes a wall formed on an outer periphery of the first housing portion, and
  wherein the first lead-out portion is formed on the wall.

4. The energy storage apparatus according to claim 1, wherein the terminal neighboring member further includes:
  a second housing portion capable of housing a third conductive member that connects the third terminal and a fourth terminal, which is a terminal different from the second terminal of the second energy storage device, to each other; and
  a second lead-out portion being disposed closer to the second housing portion than the first lead-out portion and capable of leading out the second conductive member from the second housing portion.

5. An energy storage apparatus, comprising:
  a plurality of energy storage devices including a first energy storage device including a first terminal comprising either a positive electrode terminal or a negative electrode terminal and a lid on which the first terminal is disposed and a bottom surface opposing the lid in a first direction, the first terminal protruding from the lid in the first direction;
  an outer connection terminal; and
  a terminal neighboring member that, in the first direction, is disposed adjacently to a terminal of each of the energy storage devices,
  wherein the terminal neighboring member includes:
    a conductor housing portion configured to house a first conductive member that connects the first terminal and a second terminal for a second energy storage device to each other; and
    a first lead-out portion configured to lead out, from the conductor housing portion, a second conductive member that connects the first terminal and the outer connection terminal to each other,
  wherein, when viewed from the first direction, in a second direction perpendicular to the first direction, and in a third direction perpendicular to the first direction and the second direction, the energy storage devices are arranged asymmetrical on opposing sides of centerlines of the energy storage apparatus.

6. The energy storage apparatus according to claim 5, wherein the conductor housing portion includes a bus bar arranging opening portion capable of housing a bus bar that connects the first terminal and the second terminal to each other as the first conductive member,
  wherein the first lead-out portion includes a terminal connecting opening portion from which the second conductive member is configured to be led out toward the outer connection terminal from the first terminal, and
  wherein the bus bar arranging opening portion and the terminal connecting opening portion include opening portions that penetrate different portions of the terminal neighboring member in different directions.

7. The energy storage apparatus according to claim 5, wherein the terminal neighboring member includes a wall formed on an outer periphery of the conductor housing portion, and wherein the first lead-out portion is formed on the wall.

8. The energy storage apparatus according to claim 5, wherein the terminal neighboring member further includes a second lead-out portion capable of leading out a third conductive member that connects the outer connection terminal and a third terminal, which a second energy device has, to each other.

9. The energy storage apparatus according to claim 5, wherein the energy storage apparatus includes an energy storage device housing portion in which the second energy storage device is housed, and wherein the energy storage device housing portion includes a housing portion for an energy storage device that is disposed at a position adjacently to the first energy storage device and closest to the outer connection terminal.

10. The energy storage apparatus according to claim 5, wherein the first terminal and the outer connection terminal are connected to each other without being connected to the second terminal and the third terminal.

11. An energy storage apparatus comprising according to claim 5, wherein the second conductive member extends across an open space when viewed from the first direction, the open space being devoid of an energy storage device and being capable of housing the energy storage device.

12. The energy storage apparatus according to claim 11, wherein the conductor housing portion includes an opening such that the second conducive member extends across the open space through the opening.

13. The energy storage device according to claim 11, wherein the energy storage apparatus includes a plurality of energy storage devices which are arranged in a row in a second direction orthogonal to the first direction, wherein the first energy storage device is disposed at an end of the plurality of energy storage devices in the second direction, and wherein the open space is arranged adjacently to the first energy storage device in the second direction.

14. The energy storage apparatus according to claim 1, wherein the energy storage apparatus comprises a plurality of energy storage devices including the first energy storage device and the third energy storage device, and wherein the energy storage apparatus includes a different number of the energy storage devices on opposing side of a centerline of the energy storage apparatus.

15. The energy storage apparatus according to claim 5, wherein the energy storage apparatus includes a different number of the energy storage devices on the opposing side of the centerline of the energy storage apparatus.

\* \* \* \* \*